United States Patent
Hirakawa

(10) Patent No.: US 11,567,314 B2
(45) Date of Patent: Jan. 31, 2023

(54) IMAGE DISPLAY APPARATUS AND MOBILE APPARATUS

(71) Applicant: Ricoh Company, Ltd., Tokyo (JP)

(72) Inventor: Makoto Hirakawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 195 days.

(21) Appl. No.: 16/203,697

(22) Filed: Nov. 29, 2018

(65) Prior Publication Data

US 2019/0219820 A1     Jul. 18, 2019

(30) Foreign Application Priority Data

Jan. 12, 2018 (JP) .............................. JP2018-003685

(51) Int. Cl.
    *G02B 27/01*      (2006.01)
    *G02B 30/60*      (2020.01)
    (Continued)

(52) U.S. Cl.
CPC ....... *G02B 27/0101* (2013.01); *G02B 3/0037* (2013.01); *G02B 26/101* (2013.01);
(Continued)

(58) Field of Classification Search
CPC ............ G02B 27/0172; G02B 27/0101; G02B 2027/0178; G02B 2027/0132; G02B 2027/011; G02B 26/101
See application file for complete search history.

(56) References Cited

U.S. PATENT DOCUMENTS

| 4,978,214 | A | 12/1990 | Kawata |
| 7,619,826 | B2 * | 11/2009 | Watanabe .......... G02B 27/0101 |
| | | | 345/7 |

(Continued)

FOREIGN PATENT DOCUMENTS

| DE | 102015221970 A1 * | 5/2017 | ......... G02B 27/0101 |
| EP | 2407337 A1 | 1/2012 | |

(Continued)

OTHER PUBLICATIONS

European Search Report dated Jun. 14, 2019 in corresponding European Application No. 18204675.5, 7 pages.

(Continued)

*Primary Examiner* — Alicia M Harrington
(74) *Attorney, Agent, or Firm* — Xsensus LLP

(57) ABSTRACT

An image display apparatus mountable on a mobile object includes an image light generator and a transmissive member. The image light generator is configured to generate image light and emit the image light to a transmission and reflection member mounted on the mobile object. The transmissive member is disposed in an optical path of the image light between the image light generator and the transmission and reflection member. The transmissive member is configured to transmit the image light from the image light generator. The transmissive member has a cross section with a predetermined curve, the cross section being orthogonal to a predetermined direction inclined with reference to a virtual plane orthogonal to a horizontal direction of the mobile object.

18 Claims, 19 Drawing Sheets

(51) Int. Cl.
*G02B 26/10* (2006.01)
*G02B 3/00* (2006.01)

(52) U.S. Cl.
CPC ......... *G02B 27/0149* (2013.01); *G02B 30/60* (2020.01); *G02B 2027/011* (2013.01); *G02B 2027/013* (2013.01); *G02B 2027/0118* (2013.01); *G02B 2027/0145* (2013.01); *G02B 2027/0169* (2013.01)

(56) References Cited

U.S. PATENT DOCUMENTS

| | | | |
|---|---|---|---|
| 8,289,229 B2* | 10/2012 | Ishikawa | G02B 27/0101 345/7 |
| 2002/0166273 A1 | 11/2002 | Nakamura et al. | |
| 2005/0157398 A1* | 7/2005 | Nagaoka | G02B 27/0149 359/630 |
| 2011/0317273 A1* | 12/2011 | Kasai | B60K 35/00 359/630 |
| 2014/0177022 A1 | 6/2014 | Saisho et al. | |
| 2014/0307324 A1 | 10/2014 | Cho et al. | |
| 2017/0199381 A1* | 7/2017 | Kuwabara | H04N 9/3185 |
| 2017/0320390 A1 | 11/2017 | Sato et al. | |
| 2018/0039078 A1* | 2/2018 | Cai | G02B 27/0101 |
| 2020/0096765 A1* | 3/2020 | Onda | G02B 5/0284 |

FOREIGN PATENT DOCUMENTS

| | | |
|---|---|---|
| EP | 2945000 A1 | 11/2015 |
| JP | 63-121529 | 5/1988 |
| JP | H09-101478 A | 4/1997 |
| JP | 2002331855 A | 11/2002 |
| JP | 2014-139656 | 7/2014 |
| JP | 2015-232691 | 12/2015 |
| JP | 2016-030461 A | 3/2016 |
| JP | 2016-094147 A | 5/2016 |
| JP | 2016-113151 A | 6/2016 |
| JP | 2018-010138 | 1/2018 |

OTHER PUBLICATIONS

Office Action dated May 18, 2021 in Japanese Patent Application No. 2018-003685, 4 pages.
Office Action dated Oct. 19, 2021 in Japanese Patent Application No. 2018-003685, 3 pages.

* cited by examiner

IMAGE DISPLAY APPARATUS AND MOBILE APPARATUS

CROSS-REFERENCE TO RELATED APPLICATION

This patent application is based on and claims priority pursuant to 35 U.S.C. § 119(a) to Japanese Patent Application No. 2018-003685, filed on Jan. 12, 2018 in the Japan Patent Office, the entire disclosures of which is hereby incorporated by reference herein.

BACKGROUND

Technical Field

Embodiments of the present disclosure relate to an image display apparatus and a mobile apparatus, and more particularly, to an image display device mounted on a mobile object, and a mobile apparatus including the mobile object and the image display apparatus.

Background Art

An apparatus is known that is mounted on a vehicle as a mobile object and guides image light from a light source to the windshield through a transmission member, so as to display an image (a virtual image).

In such an apparatus, a curved transmission member is used to prevent external light hitting the transmission member from being directed to an eye point of an observer such as a driver of the vehicle.

However, such an apparatus has a difficulty with a reduction in the size of the transmission member in the vertical direction (up-to-down direction) of the mobile object while preventing the external light (for example, sunlight) reflected by the transmission member from being directed to the eye point of the observer of an image.

SUMMARY

In one aspect of this disclosure, there is provided an improved image display apparatus mountable on a mobile object includes an image light generator and a transmissive member. The image light generator is configured to generate image light and emit the image light to a transmission and reflection member mounted on the mobile object. The transmissive member is disposed in an optical path of the image light between the image light generator and the transmission and reflection member. The transmissive member is configured to transmit the image light from the image light generator. The transmissive member has a cross section with a predetermined curve, the cross section being orthogonal to a predetermined direction inclined with reference to a virtual plane orthogonal to a horizontal direction of the mobile object.

In another aspect of this disclosure, there is provided an improved mobile apparatus including the above-described image display apparatus and the mobile object on which the image display apparatus is mounted.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1A:
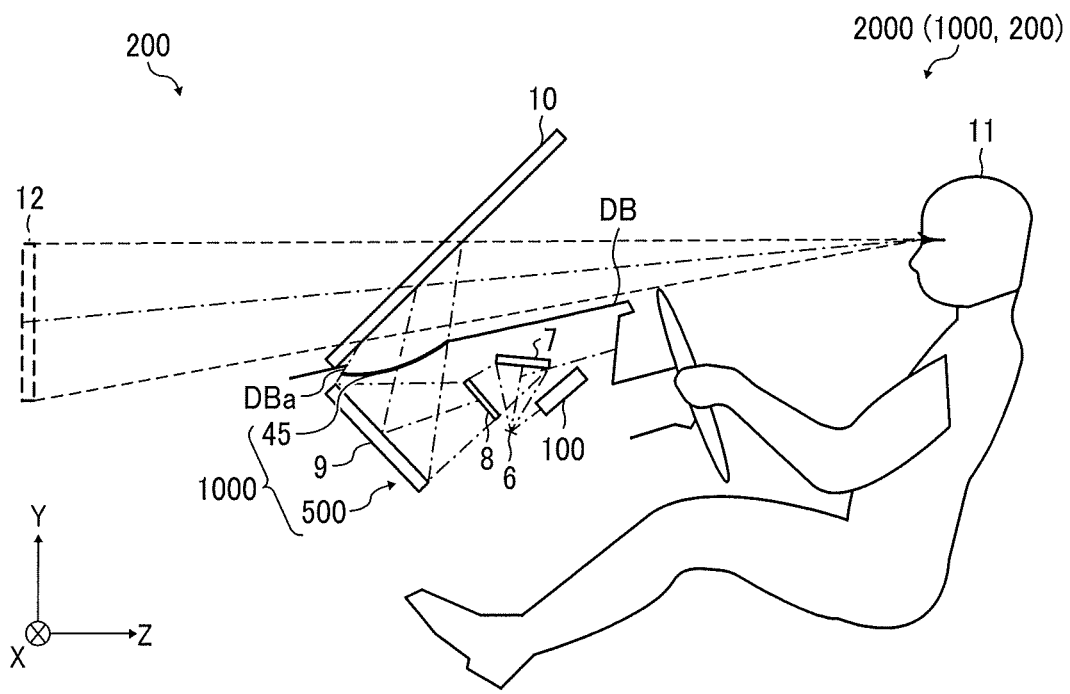
FIGS. 1A to 1C each is an illustration of an image display apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results. As used herein, the singular forms "a", "an", and "the" are intended to include the plural forms as well, unless the context clearly indicates otherwise.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described in detail with reference to the drawings. Like reference numerals designate identical or corresponding components throughout the several views and a description of same is omitted.

With initially reference with the figures, a description is provided below of embodiments of a reading device, an image forming apparatus incorporating the reading device, a reference pattern reading method, and program.

In the following, the cases where the reading device and the image forming apparatus are applied to a printing system provided with a printing device such as a commercial printing machine (production printing machine) that prints a large number of sheets continuously in a short period of time are described. However, no limitation is intended therein.

In an image display apparatus such as a head-up display (HUD), a transmissive cover is disposed to cover an opening (an exit port) for outputting the image light so as to transmit the image light and prevent dust from entering the apparatus.

When a HUD is mounted on a vehicle such as an automobile, the transmissive cover is typically provided in an opening as an exit port formed on the upper surface of the instrument panel (referred to also as a dashboard) of an automobile.

In such a case, for example, when external light such as sunlight passes through the windshield of the automobile to enter the transmissive cover, the light is then reflected by the transmissive cover and directed to (and reaches) the eye point of the driver. This might hamper driving. In view of such a situation, the technology is known (for example, JP1988-121529-A) in which the transmissive cover is configured to have a curved cross section (for example, a parabolic shape) to prevent the light reflected by the transmissive cover from reaching the eye point of the driver.

In a HUD that emits picture light (image light) to a windshield that is asymmetrically curved with reference to the front of a driver to make the driver visually recognize the image, the driver can visually recognize the image in a horizontal (normal) position by emitting the image light (of a parallelogram shape when viewed from above) inclined with respect to the lateral (right-to-left) direction of the driver's vehicle according to the curvature of the windshield.

However, the typical transmissive cover such as the transmissive cover disclosed in JP1988-121529-A has a curved cross section that is parallel with the right-to-left direction of the driver's vehicle. When the inclined image light to be emitted is configured to have a parallelogram shape when viewed from above the transmissive cover, the height difference between the lowest corner and the highest corner of the transmissive cover increases, which might adversely increase the size of the transmissive cover in the height direction (the vertical direction of the driver's vehicle).

To avoid such a situation, the present inventor has proposed the following embodiments of the present disclosure that prevent external light such as sunlight reflected by the transmissive cover from reaching the eye point of the observer of an image while reducing the size of the transmissive cover in the vertical direction of a mobile object such as a vehicle.

The following describes the theory of a reduction in the thickness of the transmissive cover designed by the present inventor.

The typical windshield of an automobile has the center that matches the center of the vehicle body in the horizontal direction of the vehicle. Further, the windshield is inclined such that the outside of the windshield is the front of the vehicle viewed from the driver.

In the case of a combiner HUD, the combiner can be designed irrespective of the vehicle body and can be designed symmetrically with respect to the front of the driver. Accordingly, when image light of a rectangular shape with the longer side substantially parallel with the horizontal direction of the automobile is emitted from an opening (an exit port) provided on an instrument panel to the combiner, the image light is not distorted by the combiner. Thus, the driver can visually recognize a rectangular image with the linger side substantially parallel with the horizontal direction of the automobile.

In the case of the image display apparatus 1000 according to the embodiments of the present disclosure that uses the windshield to display an image, image light of a rectangular is output from the opening (exit port) provided in the instrumental panel, to the windshield, so as to allow the driver to observe a rectangular image with the longer sides substantially parallel to the lateral direction of the vehicle. In this case, however, the rectangular of the light image has the longer sides inclined with reference to the lateral direction of the vehicle according to the curve of the windshield.

The transmissive cover has a shape in which a curved cross section defined within the reference plane is extended in the longitudinal direction (for example, the lateral direction of the vehicle). When the image is tilted, if the image is projected onto the reference plane, the projected area becomes wider than when the image is not tilted. When the area of the reference plane onto which the image is projected is wider, since the point further away from the origin is used, the cross section of the transmissive cover increases in the height direction.

In view of such a situation, the reference plane is inclined with reference to the lateral direction of the vehicle to reduce an area of the reference plane onto which an image is projected. Accordingly, the point far away from the origin point is not used so that the size of the cross section of the transmissive cover in the height direction is reduced.

In view of the above, the inventor has conceived of embodiments to be described below.

Example embodiments of the present disclosure are described below.

An image display apparatus 1000 according to an example embodiment of the present invention is a heads-up display (HUD) that displays a two-dimensional color image. FIG. 1A is a schematic diagram of a portion of the image display apparatus 1000.

The image display apparatus 1000 is provided, for example, for a mobile object such as a vehicle, an aircraft, and a ship, and makes navigation information used for operating the mobile object (for example, information such as route guidance, speed, and mileage) visible through a windshield 10 of the mobile object. In such cases, the windshield 10 serves as a transmission and reflection member that transmits a portion of the incident light and reflects at least some of the remaining incident light. In the following description, an XYZ three-dimensional orthogonal coordinate system that is set to the mobile object (i.e., a coordinate system that moves with the mobile object in a synchronized manner) is referred to. The X-axis direction, Y-axis direction, and Z-axis direction indicate the right-to-left direction of the mobile object (+X direction indicates the right direction, and −X direction indicates the left direction), the up-to-down direction of the mobile object (+Y direction indicates the up direction, and −Y direction indicates the down direction), and the front-to-back direction of the mobile object (−Z direction indicates the forward direction, and +Z direction indicates the backward direction), respectively. In the following description, cases in which the image display apparatus 1000 is provided for a vehicle (e.g., a car) are mainly described.

In FIG. 1A, the light source 100 emits a pixel displaying beam LC for displaying a color image.

The pixel displaying beam LC is one beam in which beams of three colors including red (R), green (G), and blue (B) are combined.

Figure 1B:
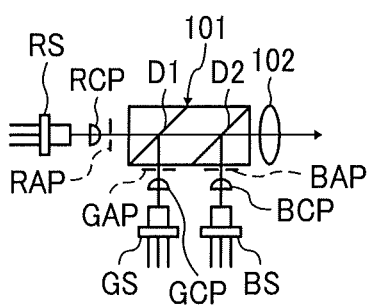

More specifically, the light source 100 is configured, for example, as illustrated in FIG. 1B.

In FIG. 1B, semiconductor lasers RS, GS, and BS, which form a light source, emit laser beams of red, green, and blue (RGB), respectively. In the present embodiment, laser diodes (LD), which are also referred to as end-surface emitting lasers, are used as the semiconductor lasers RS, GS, and BS. Alternatively, vertical cavity-surface emitting lasers (VCSEL) may be used as the semiconductor lasers RS, GS, and BS, instead of the end-surface emitting lasers.

As illustrated in FIG. 1B, coupling lenses RCP, GCP, and BCP control the divergence of the laser beams emitted from the semiconductor lasers RS, GS, and BS.

The laser beams of RGB colors whose divergence has been controlled by the coupling lenses RCP, GCP, and BCP are shaped by apertures RAP, GAP, and BAP. More specifically, the diameters of the laser beams of RGB colors are controlled by the apertures RAP, GAP, and BAP.

The shaped laser beams of RGB colors enter the beam combining prism 101.

The beam combining prism 101 includes a dichroic film D1 that transmits the R light and reflects the G light, and a dichroic film D2 that transmits the R and G light and reflects the B light.

Accordingly, a single laser-beam bundle in which the laser-beam bundles of RGB colors are combined is emitted from the beam combining prism 101.

The emitted laser-beam bundle is converted by a lens 102 into a "collimated beam" of prescribed diameter of laser-beam bundle.

This "collimated beam" corresponds to the pixel displaying beam LC.

Note that the intensity of the laser beams of RGB colors that make up the pixel displaying beam LC is modulated according to the image signal (i.e., image data) of a "two-dimensional color image" to be displayed. The intensity modulation may be performed through direct modulation in which the semiconductor lasers are directly modulated or through external modulation in which the laser-beam bundles emitted from the semiconductor lasers are modulated.

In other words, the light-emission intensity of each of the semiconductor lasers RS, GS, and BS may be modulated by a driving unit as a controller according to the image signal of RGB components.

The pixel displaying beam LC that is emitted from the light source 100 enters a two-dimensional deflector 6 that serves as an image forming element, and is two-dimensionally deflected.

In the present example embodiment, the two-dimensional deflector 6 moves a minute mirror on a pivot that is formed by two axes that are orthogonal to each other.

More specifically, the two-dimensional deflector 6 includes micro-electromechanical systems (MEMS) that include a minute pivoting mirrors formed by, for example, semiconductor processes.

Figure 10:
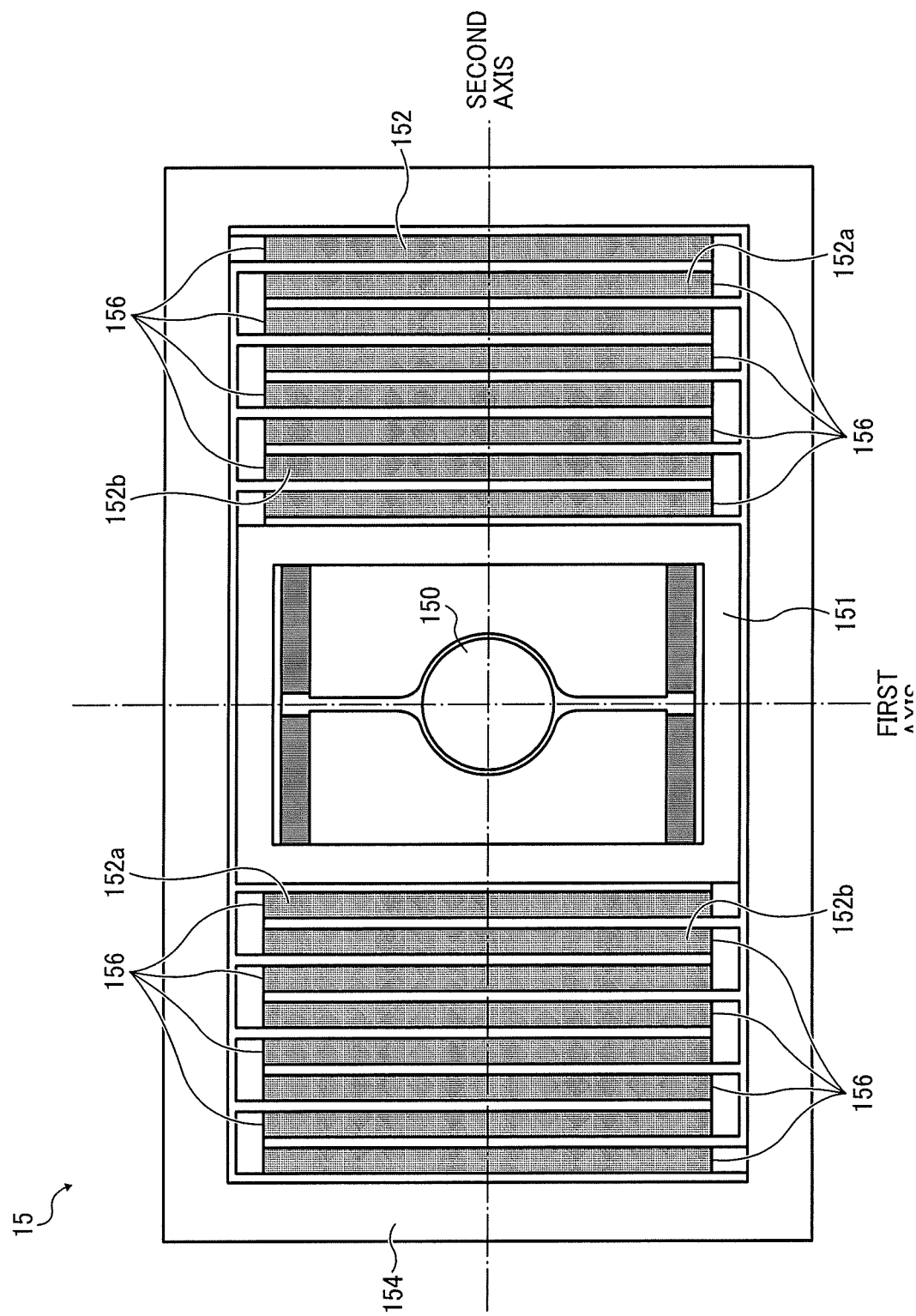
FIG. 10 is an illustration of a light deflector as a two-dimensional deflector, according to an embodiment of the present disclosure.

FIG. 10 illustrates a light deflector that serves as a two-dimensional deflector, according to the present example embodiment. As illustrated in FIG. 10, a light deflector 15 that is an example of the two-dimensional deflector 6 is a MEMS mirror that is manufactured by semiconductor processes. The light deflector 15 has a reflection plane, and includes a mirror 150 that is supported by a first frame 151 in a rotatable manner around a first axis, and supporting structure that supports the first frame 151 in a rotatable manner around a second axis that is orthogonal to the first axis. The supporting structure includes a pair of serpentine units 152 that are coupled to each other in such a manner that a plurality of beams meander, and a second frame 154 that supports the serpentine units. The serpentine units 152 are connected to the first frame 151 at one end, and are connected to the second frame 154 at the other end. Each of the beams of the serpentine units 152 is provided with a plurality of piezoelectric materials 156 (for example, PZT (lead zirconate titanate)). By applying different voltage to two of the piezoelectric materials 156 that are provided for the two neighboring beams 152a and 152b of the serpentine units 152, respectively, these two neighboring beams 152a and 152b warp in different directions. As elastic energy is accumulated in the bent portion, the mirror 150 rotates about the second axis with a wide angle. Due to such configuration as above, the optical scanning around the second axis (for example, the optical scanning in the sub-scanning direction) can be performed with low voltage. On the other hand, the optical scanning with resonance around the first axis (for example, the optical scanning in the main-scanning direction) is performed using, for example, a torsion bar that is connected to the mirror 150 and a piezoelectric actuator including a cantilever and a piezoelectric material (e.g., a PZT) that are connected between the torsion bar and the first frame 151.

However, no limitation is intended thereby, and the two-dimensional deflector 6 may be, for example, combinations of two minute mirrors that pivot on a single axis in the directions that are orthogonal to each other.

The pixel displaying beam LC that has been two-dimensionally deflected as above enters a concave mirror 7, and is reflected to a to-be-scanned surface 8.

The concave mirror 7 is designed to correct the bending of the scanning line (scanning trajectory) occurred on the to-be-scanned surface 8.

In other words, the concave mirror 7 corrects the deformation of an image formed on the windshield 10 by the two-dimensionally deflected pixel displaying beam LC.

The pixel displaying beam LC that is reflected at the concave mirror 7 shifts in parallel according to the deflection performed by the two-dimensional deflector 6, and enters the to-be-scanned surface 8 to scan the to-be-scanned surface 8 two-dimensionally. In other words, the to-be-scanned surface 8 is two-dimensionally scanned by light in a main-scanning direction and sub-scanning direction. More specifically, for example, raster scanning is performed in which high-speed scanning is performed in a main-scanning direction and low-speed scanning is performed in a sub-scanning direction.

By performing such a two-dimensional scanning as described above, a "two-dimensional color image" is generated on the to-be-scanned surface 8 as an intermediate image.

Accordingly, the light source 100, the two-dimensional deflector 6, the concave mirror 7, and the to-be-scanned surface 8 together configure an intermediate image generator (image forming unit). Moreover, the two-dimensional deflector 6 and the concave mirror 7 together configure a scanning optical system that scans the to-be-scanned surface 8 two-dimensionally by the light from the light source 100 in a main-scanning direction and sub-scanning direction.

As a matter of course, what is displayed on the to-be-scanned surface 8 is only the pixels that are being irradiated by the pixel displaying beam LC at that time.

A two-dimensional color image is formed as a "set of pixels that are momentarily displayed" realized by two-dimensional scanning using the pixel displaying beam LC.

A "two-dimensional color image" is formed on the to-be-scanned surface 8 as described above, and the light of the image data on a pixel by pixel basis (a ray corresponding to each pixel) hits the concave mirror 9 that serves as a curved mirror and is reflected by the concave mirror 9. Such a ray corresponding to each pixel is referred to as pixel light. Hereinafter, a group of a plurality of sets of pixel light forming the two-dimensional image is also referred to as image light.

The to-be-scanned surface 8 includes a "minute convex lens arrangement", as will be described later. The concave mirror 9 configures a "virtual image forming optical system" (projection optical system).

The concave mirror 9 is designed and arranged to correct a factor in optical deformation in which the horizontal line (i.e., the straight line that extends in the right-to-left direction) of the "two-dimensional color image" (i.e., intermediate image) formed on the to-be-scanned surface 8 become convex upward or downward due to the influence of the windshield 10.

The "virtual image forming optical system" forms the magnified virtual image 12 of the "two-dimensional color image".

The windshield 10 is arranged between the image forming position of the magnified virtual image 12 and an observer 11, and the windshield 10 reflects the laser-beam bundle (image light) that forms the magnified virtual image 12 reflected from the concave mirror 9, towards the observer 11. The observer 11 (for example, a driver of the mobile object) visually recognizes the virtual image at a prescribed position on the optical path of the light-beam bundle (image light) reflected by the windshield 10 (i.e., transmission and reflection member).

The light source 100, a two-dimensional deflector 6, the concave mirror 7, the to-be-scanned surface 8, and the concave mirror 9 together configure an image light generation unit 500 (an image light generator) that forms image light and emits the image light to the windshield 10.

The observer 11 visually recognizes the magnified virtual image 12 by the light reflected towards the observer 11 as above.

The image display apparatus 1000 is installed in the dashboard DB of the automobile, and an opening DBa is formed in the dashboard DB (see FIG. 1A), serving as an exit port of the image light reflected by the concave mirror 9, that is, the image light generated by the image light generation unit 500. The opening DBa is covered with a transmissive cover 45 as a transmissive member. In other words, the transmissive cover 45 is attached to the periphery of the opening DBa in the dashboard DB so as to cover (close) the opening DBa.

In other words, the transmissive cover 45 is disposed on the optical path of the image light between the image light generation unit 500 and the windshield 10. A detailed description of the transmissive cover 45 will be given later.

In FIG. 1A, the Y-axis direction usually corresponds to the up-to-down direction for the observer 11, and the Y-axis direction is also referred to as a vertical direction.

In FIG. 1A, the X-axis direction usually corresponds to the right-to-left direction for the observer 11, and the X-axis direction is also referred to as a lateral (horizontal) direction.

As described above, the to-be-scanned surface 8 has a minute convex lens arrangement.

As will be described later, the minute convex lens arrangement has a plurality of minute convex lenses (microlenses) that are closely arranged at a pitch close to the pitch of pixels. In other words, the to-be-scanned surface 8 is a microlens array.

In the present embodiment, the multiple minute convex lenses are two-dimensionally arranged at a prescribed pitch along an assumed plane parallel with the X-axis direction such that each of the convex surfaces of the minute convex lenses becomes an incidence plane. More specifically, the minute convex lenses may be arranged, for example, in a honeycomb array (zigzag array) or in a matrix where the X-axis direction is set to the row direction and the direction orthogonal to the X-axis direction in the assumed plane is set to the column direction.

The planar shape of the minute convex lenses may be, for example, a circle, a regular triangle, a square, or other regular shapes with a greater number of angles. In the present example embodiment, it is assumed that the minute convex lenses have equal curvature (radius of curvature).

Each of the minute convex lenses isotropically diffuses the pixel displaying beam LC. In other words, each of the minute convex lenses has even diffusing power in all directions, if desired. Such "diffusing function" is briefly described below.

Figure 1C:
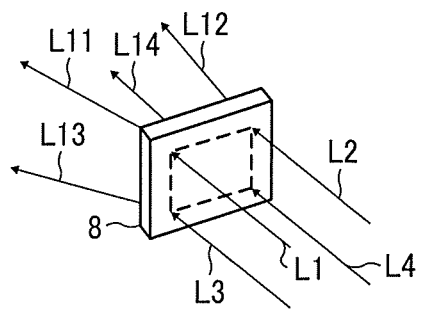

FIG. 1C illustrates four pixel displaying beams L1 to L4 that enter the to-be-scanned surface 8, according to the present embodiment.

The four pixel displaying beams L1 to L4 enter the to-be-scanned surface 8 at the four corners of the two-dimensional image formed on the to-be-scanned surface 8.

As the four pixel displaying beams L1 to L4 passes through the to-be-scanned surface 8, the pixel displaying beams L1 to L4 are converted into beams L11 to L14.

Assuming that a laser-beam bundle whose cross section is a horizontally oriented quadrangle surrounded by the pixel displaying beams L1 to L4 enters the to-be-scanned surface 8, such a laser-beam bundle becomes a "divergent laser-beam bundle whose cross section is a horizontally-oriented quadrangle surrounded by the beams L11 to L14".

The function of the minute convex lenses as described above is referred to as the "diffusing function".

The "divergent laser beam whose cross section is a horizontally-oriented quadrangle surrounded by the beams L11 to L14" is obtained by temporally collecting the pixel displaying beam that has been converted into a divergent laser beam as described above.

The pixel displaying beam is diffused such that the laser-beam bundle reflected by the windshield 10 illuminates a wider area in the proximity of the observer 11.

When the diffusing function described above is not available, the laser-beam bundle reflected at the windshield 10 illuminates only a small area in the proximity of the observer 11.

For this reason, when the observer 11 moves his/her head and the position of the eyes deviates from the "small area", the observer 11 can no longer visually recognize the magnified virtual image 12.

By diffusing the pixel displaying beam as described above, the laser-beam bundle reflected by the windshield 10 illuminates a wide area in the proximity of the observer 11.

Accordingly, even if the observer 11 slightly moves his/her head, the observer can visually recognize the magnified virtual image with reliability.

The HUD as described above may be provided, for example, for a vehicle such as a car, and the X-axis direction and the Y-axis direction indicate "the right-to-left direction with reference to a driver's seat" and "the up-to-down direction with reference to the driver's seat", respectively.

According to the present example embodiment, for example, a "navigation image" can be displayed ahead of the windshield of a car or the like as the magnified virtual image 12, and a driver as the observer 11 can observe such a navigation image without moving his/her line of vision away from the ahead of the windshield while staying in the driver's seat.

In such an embodiment, it is desired that the magnified virtual image be a "horizontally-oriented image when seen from a driver", as described above. In other words, it is desired that the image formed on a microlens and the magnified virtual image be an image whose angles of view is wider in the X-axis direction.

It is also desired that "the viewing angle be wider in the lateral direction than in the vertical direction" such that a driver as the observer can recognize the displayed image even in a slanting direction from the right and left sides.

For this reason, a greater diffusion angle (anisotropic diffusion) is required for the longer-side direction (i.e., X-axis direction) of the magnified virtual image, with reference to the shorter-side direction (i.e., Y-axis direction) of the magnified virtual image.

Accordingly, it is desired that the minute convex lenses of the to-be-scanned surface 8 be anamorphic lenses whose curvature is greater in the longer-side direction than in the shorter-side direction of an image formed on a microlens or a magnified virtual image, and that the diffusion angle of the pixel displaying beam be wider in the lateral direction than in the vertical direction of a two-dimensional image.

As described above, according to the example embodiment of the present invention, the utilization efficiency of light and the brightness of display image can be improved as the light is dispersed to a minimum area that satisfies the desired angle of view of a HUD.

As a matter of course, "isotropic diffusion" in which the diffusion angle is equal between the lateral direction and the vertical direction may be applied instead of the "anisotropic diffusion" described above.

However, as long as a vehicle-installed HUD for a car or the like is concerned, there are few cases in which the driver observes a displayed image from up-to-down direction.

Accordingly, as long as a vehicle-installed HUD is concerned, it is desired that the diffusion angle of the pixel displaying beam be "wider in the lateral direction than in the vertical direction of a two-dimensional image" as described above in view of the utilization efficiency of light.

It is known that the surface of a minute convex lens (microlens) can be formed as "aspherical surface".

The anamorphic lens has "aspherical surface", and the use of such an anamorphic lens enables the aspherical surface of a minute convex lens as desired. Moreover, the use of the anamorphic lens can perform aberration correction.

With the aberration correction, "nonuniformity in diffusion intensity" may be reduced.

The application of the HUD according to the example embodiment of the present invention is not limited to a car as described above, but the HUD may be applied to various kinds of operable mobile objects such as trains, ships, helicopters, and aircrafts.

As a matter of course, the HUD according to the present example embodiment may be implemented, for example, as an "image display apparatus for movie viewing".

The minute convex lenses in the minute convex lens arrangement diffuse the pixel displaying beam as described above, but may diffuse the pixel displaying beam only in a single direction between the X-axis direction and the Y-axis direction.

In such cases where diffusion is performed only in a single direction, "minute convex cylinder surface" may be applied to the lens surface of the minute convex lenses.

The shape of the minute convex lens may be shaped as a hexagon, and the minute convex lenses may be arranged like a honeycomb. Such variations are conventionally known in the art of microlens array manufacturing method.

The market expectations for the HUD as the image display apparatus 1000 described above are running high as application by which a driver can recognize an alert or other kinds of information with a little movement of his/her line of sight. In recent years, the technology development of HUDs for vehicles (for example, cars, motorbikes, trains) are advancing in particular. In recent years, the technology development of HUDs for vehicles (for example, cars, motorbikes, trains) are advancing in particular.

The HUDs are broadly divided into a windshield projection type in which the light that forms the image is projected towards the windshield and a combiner projection type in which the light that forms the image is projected towards a transmission and reflection member (combiner). In view of the interior design of a vehicle or discomfort caused by an obstructing combiner, HUDs of the windshield projection type are preferred.

As known in the art, a HUD of the windshield projection type is integrated into the dashboard of a vehicle, and serves as a module (image display apparatus) that reflects an intermediate image formed inside the dashboard to the windshield using a mirror or the like to display the magnified virtual image 12 with certain distance from the viewpoint of the observer 11. The observer 11 may be referred to as the driver in the following description. Note that the viewpoint of the observer 11 merely indicates a reference position (eye point). It is assumed that the range of the viewpoint of the observer 3 is equal to or less than the eye point of car driver (JIS D 0021).

The demands for HUDs in the market are summarized in the following two points.

Downsizing

Stress-free visual recognition

In regard to the "downsizing", a size is desired not to interfere the ducts, meters, and defroster stored in the dashboard, and the body structure. This is because changes in the position of ducts, meters, and defroster or the changes in body structure due to the installation of a HUD lead to reduction in air-conditioner performance, defroster performance, and the body strength of the car.

In regard to the "stress-free visual recognition", stress-free graphic is desired for the environment of a driver because a HUD displays graphics around his/her sight at all times. If the graphics lacks "instant readability", for example, when the information is hard to read or the information is deformed and awkward, the HUD that serves as an information display apparatus (image display apparatus) may become an impairing factor for the sight of the driver.

As the projection method of HUD, a "panel system" in which an intermediate image is formed by an imaging device such as a liquid crystal panel or digital micromirror device (DMD) panel, or a "optical scanning system" in which an intermediate image is formed by performing two-dimensional optical scanning on a to-be-scanned surface are known in the art.

In particular, the "optical scanning system" is advantageous in achieving "Downsizing" and "Stress-free visual recognition" because an intermediate image can be formed by optical design without being influenced by the performance of the installed imaging device.

In the typical HUD of the windshield projection type, an area of the windshield that the light that forms an intermediate image enters is bent asymmetrically in the right-to-left direction and thus optical deformation is asymmetrically caused on the virtual image. An attempt to correct such optical deformation by the design of the projection optical system (i.e., the optical system that guides the light that has passed through a to-be-scanned surface to the windshield) typically leads to an increase in the number of the optical elements in the projection optical system, and such an increase affect the "Downsizing".

Figure 2:
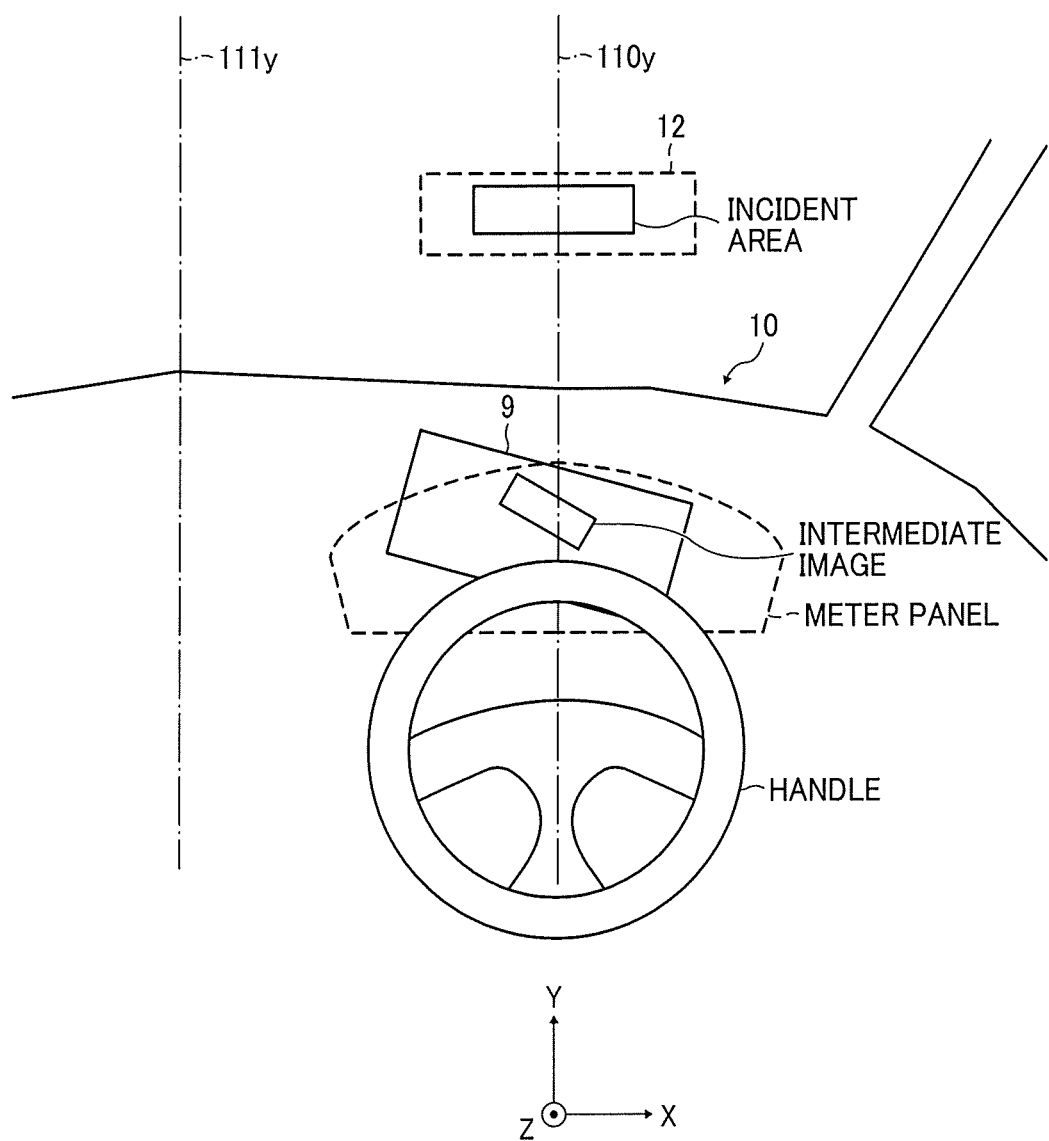
FIG. 2 is an illustration of an image display apparatus according to another embodiment of the present disclosure.

In detail, as illustrated in FIG. 2 for example, the windshield 10 is gradually bent backward from a center position 111$y$ of the right-to-left direction of the vehicle (X-axis direction) to the door side on the right (+X side), and an upper portion (+Y side) of the windshield 10 along the up-to-down direction (Y-axis direction) of the vehicle is obliquely bent backward (+Z side).

In other words, the windshield 10 is asymmetrically bent backward (where a right portion of the windshield is bent backward to a greater degree) with reference to a center position 110$y$ in the right-to-left direction corresponding to the driver's seat of the vehicle, and an upper portion of the windshield 10 in the up-to-down direction of the vehicle is obliquely bent backward.

The light that has passed through the to-be-scanned surface 8 and the concave mirror 9 enters the incidence area of the windshield 10 (on −Z side), and the light that is reflected at the incidence area enters the eyes of the driver. As a result, the driver can visually recognize the magnified virtual image 12 (see FIG. 2). However, the incidence area is also asymmetrically bent backward (where a right portion of the windshield is bent backward to a greater degree), and an upper portion of the incidence area in the up-to-down direction of the vehicle is obliquely bent backward. More specifically, the windshield 10 is gradually bent so as to be oblique to the Y-axis direction and convex towards the +Y side. Note that the center of the incidence area and the center of the magnified virtual image 12 in the X-axis direction matches the center position 110$y$.

Accordingly, when an image whose longer-side direction is parallel to the X-axis direction is formed on the to-be-scanned surface 8, deformation may be caused on the virtual image to be visually recognized by the driver due to the horizontally-asymmetrical shape of the incidence area.

Moreover, when an image parallel to the XY plane is formed on the to-be-scanned surface 8 upon arranging the to-be-scanned surface 8 parallel to the XY plane, deformation may be caused on the virtual image to be visually recognized by the driver due to the bent shape of the incidence area.

The deformation as described above is caused to a greater degree when the magnifying power of the image (i.e., intermediate image), in particular, the magnifying power of the projection optical system, is large and the virtual image is large in the HUD.

Here, the deformation on the virtual image when a HUD of the windshield projection type whose projection optical system has the only one concave mirror 9 is installed in a vehicle with right-side steering wheel is described. For the purpose of simplification, it is assumed in the present example embodiment that a reflection plane of the concave mirror 9 is planar and the windshield 10 is shaped like a flat plate.

Figure 3:
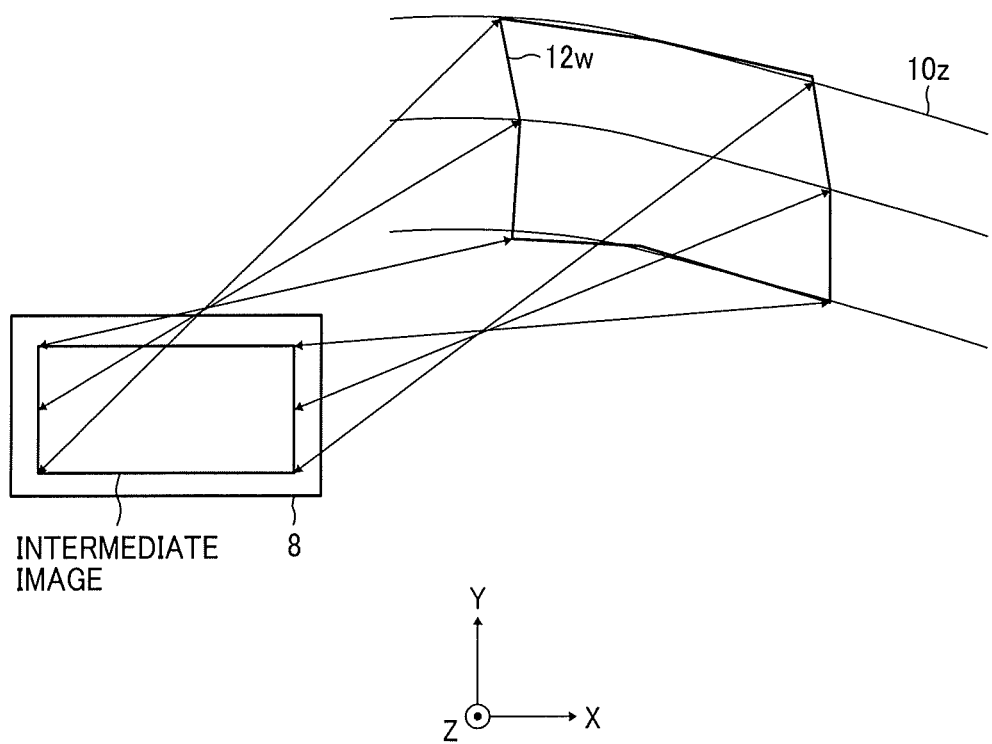
FIG. 3 is an illustration of an image display apparatus according to still another embodiment of the present disclosure.

FIG. 3 illustrates a state in which an image (intermediate image) whose longer-side direction is parallel to the horizontal plane (i.e., XZ plane) is formed on the to-be-scanned surface 8 and the points of the to-be-scanned surface are projected onto the windshield 10.

As described above, the windshield 10 is a transmission and reflection member that is convex in the +Y direction. Accordingly, when depth lines 10$z$ are plotted on the windshield 10 in the Z-axis direction (i.e., the front-to-back direction of the vehicle), such depth lines 10$z$ are gradually oblique to the door side on the right (i.e., +X side).

In such cases, the incidence area of the windshield 10 becomes as indicated by the reference sign "12$w$" in FIG. 3. Note that as the projection optical system has the only one concave mirror 9, the relative positions of the surface are inverted in the vertical direction due to the projection from the concave mirror 9 to the windshield 10 (see FIG. 1A).

Due to the gradually-oblique shape of the windshield 10 as described above, a deformed mode is present in which, for example, the incidence area of the windshield 10 as indicated by the reference sign 12$w$ is "oblique to the door side" or "deformed as distant from the center line of the vehicle", as a factor in optical deformation in which the shape of the windshield 10 on the driver's seat side (i.e., right side) is reflected.

Accordingly, in this embodiment, in order to deal with such a deformation mode, as illustrated in FIG. 2, the longer-side direction of the image (intermediate image) that is formed on the to-be-scanned surface 8 is made oblique to the XZ plane (i.e., the virtual plane orthogonal to the up-to-down direction of the vehicle).

More specifically, the longer-side direction of the image that is formed on the to-be-scanned surface 8 is made oblique so as to be lower in the +X-axis direction (i.e., to the door side of the vehicle) with reference to the X-axis direction (i.e., the right-to-left direction of the vehicle) when viewed from the Z-axis direction (i.e., the front-to-back direction of the vehicle). In other words, the image that is formed on the to-be-scanned surface 8 is made oblique so as to be lower (oblique towards the −Y side) in the +X-axis direction with reference to the Z-axis direction.

Figure 4A:
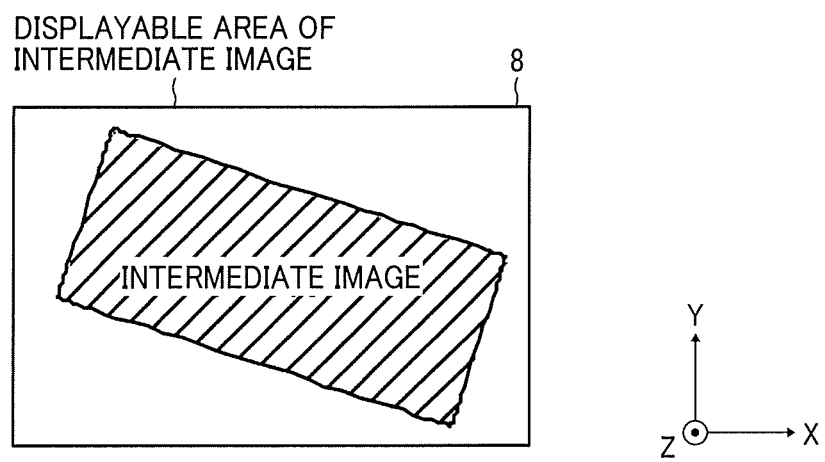
FIGS. 4A and 4B each is an illustration for explaining a method of forming an intermediate image on a to-be-scanned surface according to an embodiment of the present disclosure.
Figure 4B:
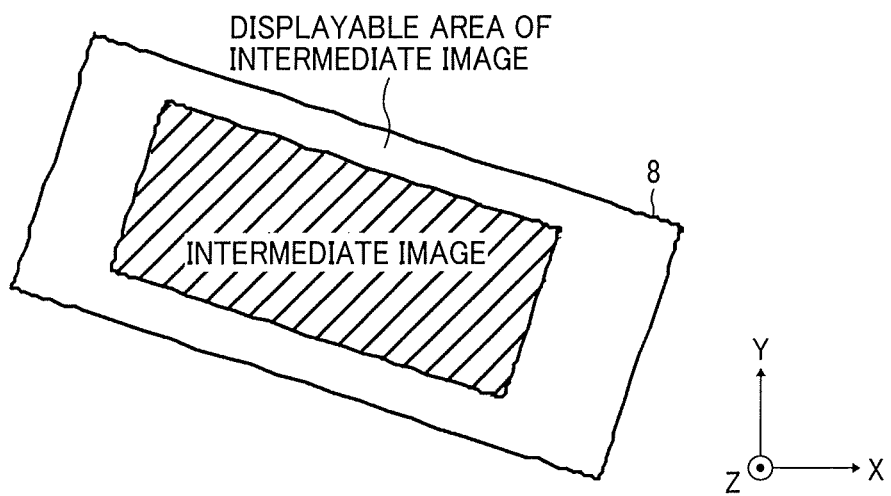

When the intermediate image is made oblique, as illustrated in FIG. 4A, only the intermediate image may be made oblique without making the to-be-scanned surface 8 oblique. Alternatively, as illustrated in FIG. 4B, the to-be-scanned surface 8 may be made oblique together with the intermediate image.

When the intermediate image is made oblique, the intermediate image may be formed by performing two-dimensional scanning where the X-axis direction is the main-scanning direction, according to, for example, the image data obtained by making the original image oblique. Alternatively, the intermediate image may be formed by performing two-dimensional scanning where the direction oblique to the X-axis direction is the main-scanning direction, according to the original image data.

Note that when the X-axis direction is the main-scanning direction, the pivot that corresponds to the main scanning direction of the two-dimensional deflector 6 is to be made parallel to the Y-axis. When the direction oblique to the X-axis direction is the main scanning direction, the pivot that corresponds to the main scanning direction of the two-dimensional deflector 6 is to be made oblique to the Y-axis.

Figure 5:
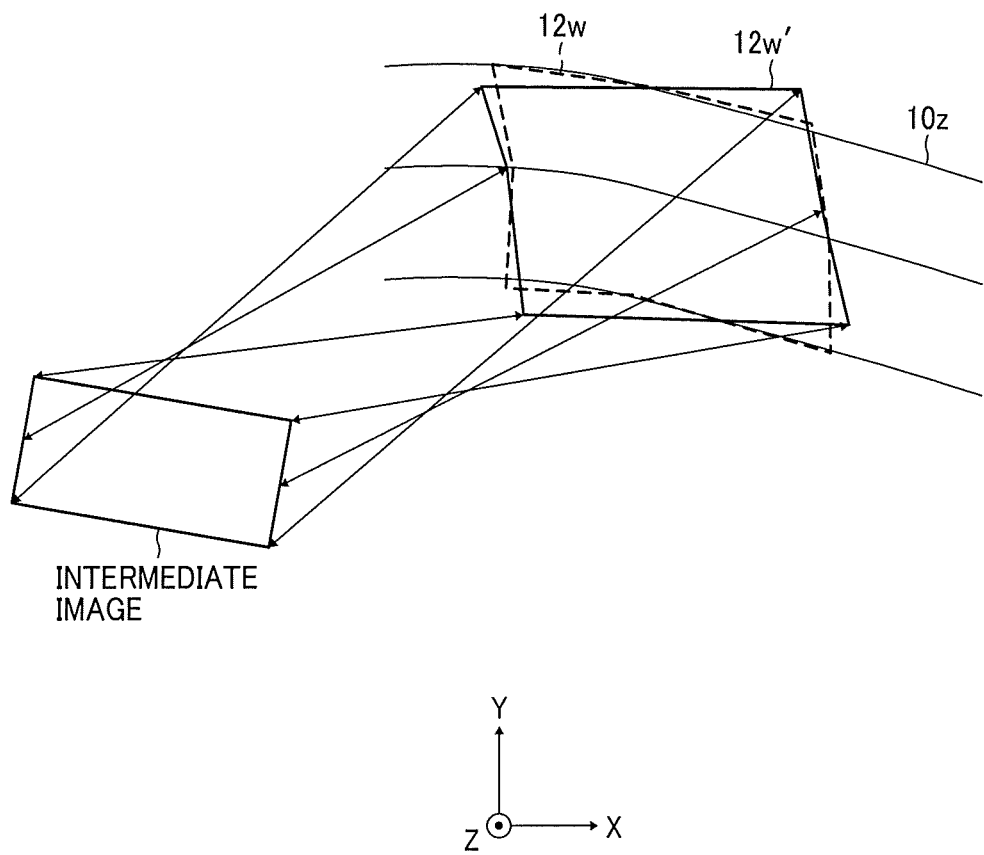
FIG. 5 is an illustration for explaining an effect obtained by making an intermediate image oblique, according to an example embodiment of the present disclosure.

As described above, the inclination of the depth line 10z of the windshield 10 can be corrected by making the intermediate image oblique with reference to the X-axis direction. More specifically, the incidence area of the windshield 10 that is viewed from the driver can be corrected from the area indicated by the broken lines 12w to the area indicated by a solid line 12w' (see FIG. 5). As a result, the deformation of the virtual image due to the horizontally-asymmetrical bent shape of the incidence area of the windshield 10 may be reduced.

Note that in the present example embodiment, it is assumed that the reflection plane of the concave mirror 9 is planar and the windshield 10 is shaped like a flat plate, and the arrangement of the to-be-scanned surface 8 and the concave mirror 9 is not taken into consideration. For this reason, a prescribed oblique direction of the intermediate image is not limited to the examples described above.

As the shape of the windshield varies for each vehicle type, it is desired that the prescribed oblique angle of the intermediate image be determined differently for each vehicle type so as to reduce the deformation of the virtual image as much as possible.

In the present example embodiment, the intermediate image (the to-be-scanned surface 8) and the incident laser-beam bundle (the concave mirror 9) are made oblique to the Y-axis direction with reference to the X-axis direction (see FIG. 1A). The term "incident laser-beam bundle" indicates the laser-beam bundle that enters the reflection plane of the concave mirror 9.

In such cases, the deformation of the virtual image, which is viewed from the X-axis direction, due to the inclination of the incidence area of the windshield 10 with reference to the Y-axis direction can be attenuated.

In the present embodiment, the longer-side direction of the concave mirror 9 is made oblique to the XZ plane. More specifically, the longer-side direction of the concave mirror 9 is made oblique to the X-axis direction with reference to the Z-axis direction (see FIG. 2).

In such cases, it is desired that the oblique direction of the concave mirror 9 be equal to the oblique direction of the intermediate image (i.e., downward to the right), and that the oblique angle of the concave mirror 9 be equal to or less than the oblique angle of the intermediate image. Accordingly, the light that forms an intermediate image enters the concave mirror 9 with reliability.

According to the present embodiment, the image that is formed on the to-be-scanned surface 8 (i.e., intermediate image) has the following feature. Note that the intermediate image is formed by projecting the trajectory of the scanning beams on the to-be-scanned surface 8.

Shearing deformation is performed on the intermediate image from the center position 111y of the vehicle in the right-to-left direction to the door on the right side (in the X-axis direction).

Figure 6:
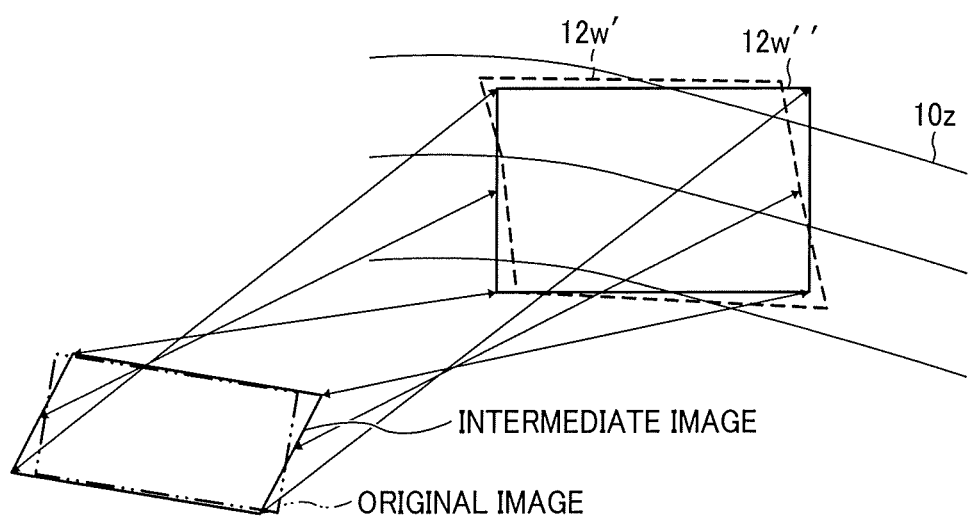
FIG. 6 is an illustration for explaining an effect obtained by using a shear deformed image.
Figure 6:
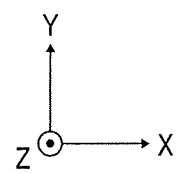
Figure 7:
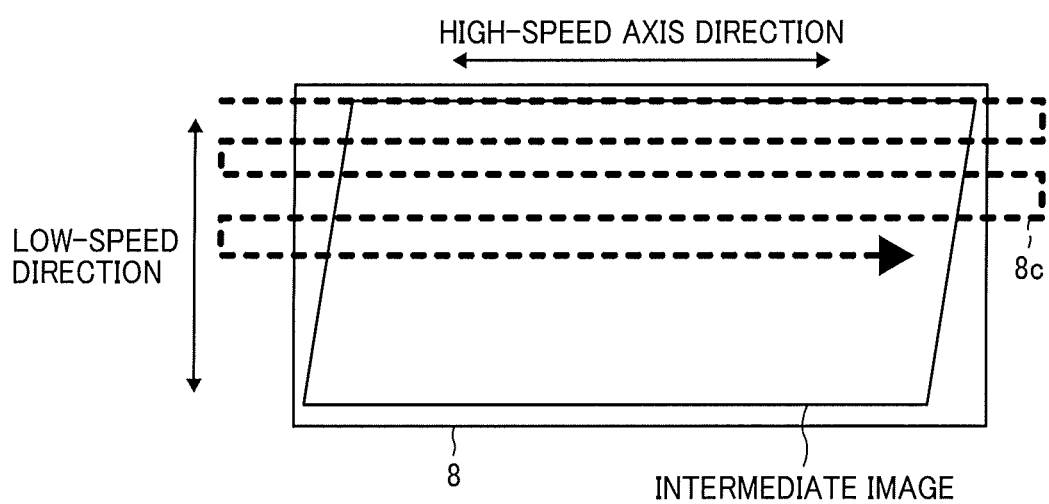
FIG. 7 is an illustration for explaining a method of forming a shear deformed image according to an embodiment of the present disclosure.

Even if the intermediate image is made oblique to the normal line to the surface of the to-be-scanned surface 8 in the direction of rotation, errors in magnification remain on several portions of the image due to the influence of the partial curvature of the windshield 10, and thus a shearing strain remains as illustrated by broken lines 12w' in FIG. 6. If shearing deformation is performed in advance on the intermediate image to the door side of a vehicle with right-side steering wheel (such that a portion of the intermediate image on the +X side is deformed to move to the +Y side, i.e., such that a portion of the intermediate image on a positive side in the right-to-left direction is deformed to move to a positive side in the vertical direction) as illustrated in FIG. 6, "the deformation of the virtual image due to the shape of a windshield" as described above may effectively be attenuated (see a solid line 12w''' in FIG. 6). In other words, in such cases, the intermediate image is distorted in the lateral direction of the image as illustrated in FIG. 7.

In order to apply shearing strain to the intermediate image, for example, shearing deformation is performed on original image data (e.g., rectangular image data), and an image that corresponds to the image data on which the shearing deformation has been performed (e.g., parallelogram image data) is formed by a two-dimensional deflector. Alternatively, the start timing and end timing of scanning in the main scanning direction may be performed with a certain time lag for each line or each set of a plurality of lines on original image data (for example, a rectangular image data) (see FIGS. 7 to 9).

Note that in the present embodiment, the reflection plane of the concave mirror 9 is assumed to be planar and the relative position of the to-be-scanned surface 8 and the concave mirror 9 is not taken into consideration. For this reason, the direction of the shearing strain that is applied in advance to the intermediate image is not limited to the examples described above.

Further, in the present embodiment, the scanning direction of a two-dimensional deflector includes a high-speed axis direction and a low-speed axis direction along the two axes, and the high-speed axis direction corresponds to the longer-side direction of the to-be-scanned surface.

In the optical scanning system according to the present embodiment, an image (intermediate image) is drawn with a dissonance method in the shorter-side direction and is drawn with a resonance method in the longer-side direction. This is because a wider amplitude is to be generated by the two-dimensional deflector 6 in the longer-side direction than in the shorter-side direction. Assuming that the directions of the two axes of the two-dimensional deflector 6 are the high-speed axis direction (i.e., the main scanning direction) and the low-speed axis direction (i.e., the sub-scanning direction), the longer-side direction of the intermediate image corresponds to the high-speed axis direction, and the shorter-side direction of the intermediate image corresponds to the low-speed axis direction.

When the high-speed axis direction and the low-speed axis direction correspond to the longer-side direction and shorter-side direction of the intermediate image, respectively, the trajectory of the scanning beam on the to-be-scanned surface 8 is as illustrated by arrow with broken lines 8c in FIG. 7. Accordingly, shearing deformation can be performed without deforming two or more scanning lines of the image at the same time in the X-axis direction. When the image is deformed over two or more scanning lines in the X-axis direction, a horizontal line is drawn in several sections by the two or more scanning lines, and thus a flicker appears on the horizontal line.

The position (drawing positioned) of the image can be accurately adjusted along the scanning lines in the high-speed axis direction (i.e., the main scanning direction) of the two-dimensional deflector, by adjusting the timing in which the light source emits light.

In the low-speed axis direction (i.e., the sub-scanning direction) of the two-dimensional deflector, the two-dimensional deflector is able to adjust the drawing position within the width between the scanning lines.

It is known in the art that the minimum width with which an image can be adjusted is smaller in the high-speed axis direction than in the low-speed axis direction, and thus finer adjustment of the image is possible in the high-speed axis direction.

Figure 8:
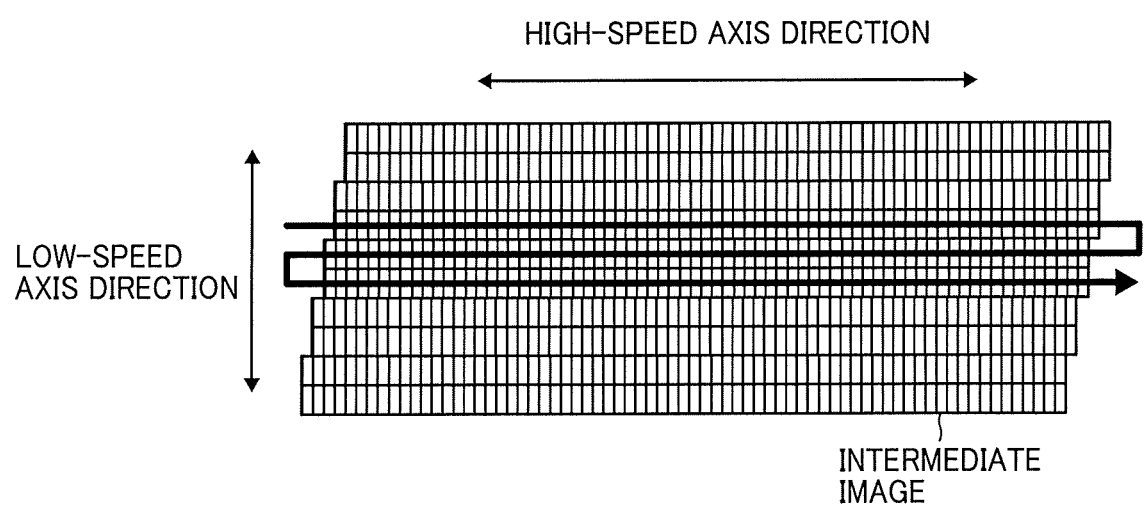
FIG. 8 is an illustration for explaining a method of forming a shear deformed image according to another embodiment of the present disclosure.
Figure 9:
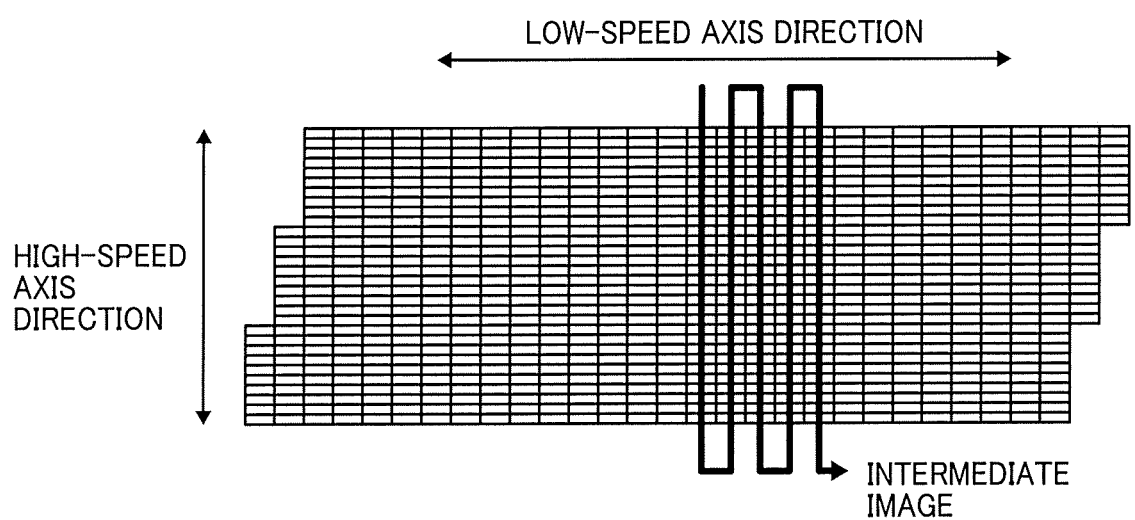
FIG. 9 is an illustration for explaining a method of forming a shear deformed image according to still another embodiment of the present disclosure.

FIG. 8 is an illustration of an image (shearing deformed image) obtained by performing shearing deformation on an original image (i.e., rectangular image data in this example) when the longer-side direction of the image matches the high-speed axis direction (i.e., the main scanning direction) of the two-dimensional deflector, according to an embodiment of the present disclosure. FIG. 9 is an illustration of an image (shearing deformed image) obtained by performing shearing deformation on an original image (i.e., rectangular image data in this example) when the shorter-side direction of the image matches the high-speed axis direction (i.e., the main scanning direction) of the two-dimensional deflector, according to an embodiment of the present disclosure.

In FIG. 8 and FIG. 9, each small rectangular dot indicates a minimum unit that can be modified to adjust the position of an image and to deform the image.

In FIG. 8, each unit with which the position of the image is adjusted in the longer-side direction is small after shearing deformation is performed on the original image. Accordingly, the oblique lines at the edges of the image can be drawn smoothly.

In FIG. 9, by contrast, each unit with which the position of the image is adjusted in the longer-side direction is coarse in each scanning line. Accordingly, a zigzag tends to be visually recognized in the oblique lines at the edges of the image.

As illustrated in FIG. 1A, in the present example embodiment, it is necessary for the projection light (i.e., the light projected from the projection optical system) to be magnified compared with the intermediate image such that the display image (virtual image) can be observed at the viewpoint of the driver. In projection optical systems of the conventional HUDs, the optical path length is relatively large, and the magnifying power is small, and thus the angle of divergence of the laser-beam bundle is not necessarily so large to observe the displayed image accurately.

However, in order to achieve both the downsizing of the apparatus and the large screen for the display image, as expected in the art in recent years, reduction in the optical path length and increase in magnification are required as implemented in the present example embodiment. In order to implement such reduction in the optical path length and increase in magnification, it is necessary to widen the angle of divergence of the laser-beam bundle.

In such cases, it is desired that the scanning optical system be compatible with the characteristics of the projection optical system in the intermediate image generator. More specifically, it is desired that the laser-beam bundle dispersed at the to-be-scanned surface 8 become wider from the center to periphery (edge) of the to-be-scanned surface 8.

In so doing, the efficiency becomes optimal if the angle of the main light beam of the scanning beam that enters the to-be-scanned surface 8 matches the angle of the main light beam of the scanning beam that exits from the to-be-scanned surface 8.

However, in reality, it is difficult for these two angles to achieve complete match. In particular, the degree of difficulty with such a complete match further increases when the restriction increases due to downsizing and increase in the size of the screen.

As described above, it is desired that the beam that enters the to-be-scanned surface 8 have incidence angle distribution that gradually becomes wider from the central portion to the edges in the main-scanning direction of the to-be-scanned surface 8.

Moreover, due to such arrangement of light beam, the light that diverges from the to-be-scanned surface 8 may be controlled to enter the effective range of the concave mirror 9 without loss. Accordingly, the efficiency of the light beam improves.

According to the configuration as described above, the divergence of the light required to observe an image may be minimized. Accordingly, the high brightness of an entire image is achieved, and an image with high visual recognizability is achieved under a wider range of external environment.

As described above, since the image display apparatus 1000 is installed in the dashboard DB of the automobile, an opening DBa is formed in the dashboard DB so as to allow the image light to exit the dashboard DB. If the opening DBa is open, dust might enter through the opening DBa. For this reason, the opening DBa is covered with the transmissive cover 45.

The transmissive cover 45 is configured to have the following four types of capability.

1) a transmittance sufficient to transmit the image light 2) capable of controlling the reflection direction of primary reflected light (external light, such as illumination light from an oncoming vehicle or lighting facility, reflected by the exit-side surface or the incident-side of the transmissive cover 45), so as to prevent the primary reflected light and secondary reflected light (the primarily reflected light that has been further reflected by the windshield 10) from reaching the eye point of the driver. By controlling the reflection direction of the primary reflected light, the reflection direction of the secondary reflected light can be controlled as a result. That is, the transmissive cover 45 is configured to prevent external light (the primary reflected light and the secondary reflected light) reflected by the transmissive cover 45, from being reflected in, i.e., reaching the eye point of the driver together with the image light.

3) a reduction in size in the height direction (up-to-down direction), i.e., thinner Since the transmissive cover 45 is attached to cover the opening DBa (exit port) formed in the dashboard DB, it is desirable that the transmissive cover 45 does not project as much as possible from the opening DBa. That is, the transmissive cover 45 is desirably thinner.

4) capable of preventing the primary reflected light (external light, such as sunlight, that has been reflected by the transmissive cover 45) from being focused on one point. A detailed description of the four types of capability above are given below.

The first characteristic feature is achieved by configuring the transmissive cover 45 to be made of translucent resin or glass having high transparency or high transmittance.

Regarding the second characteristic feature, if the transmissive cover 45 is flat, the primary reflected light of external light might be directly directed to the eye point of the driver. Accordingly, the transmissive cover 45 is preferably curved.

Figure 11A:
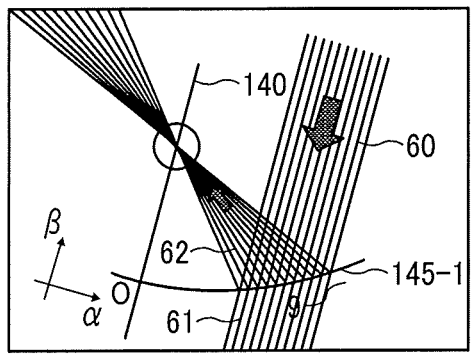
FIGS. 11A and 11B are illustration for explaining the characteristics of sunlight reflected by a transmissive cover according to Comparative Example 1.
Figure 11B:
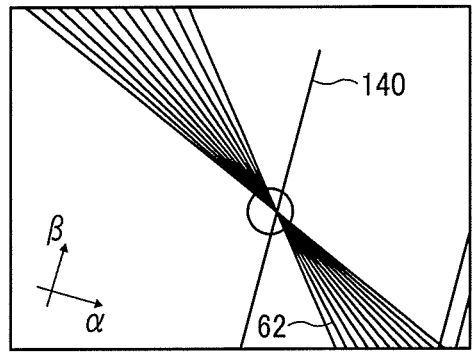

FIGS. 11A and 11B are illustration of a curved transmissive cover 145-1 having a parabolic cross section, according to Comparative Example 1.

The parabola has a focal point and all rays incident parallel to the symmetrical axis of the parabola with respect to the parabola pass through the focal point of the parabola when reflected.

That is, when light comes to hit the transmissive cover 145-1 from a direction parallel to the symmetrical axis 140 of the parabola drawn by the cross section of the transmissive cover 145-1, the light reflected by the transmissive cover 145-1 intersects at one point (focal point of the parabola). In this case, however, the fourth capability is not achieved.

Specifically, as illustrated in FIG. 11A, sunlight 60 comes to hit the transmissive cover 145-1, and is then divided into transmitted light 61 and reflected light 62.

In this case, as sunlight is assumed as a parallel light flux, the sunlight 60 comes to hit the transmissive cover 145-1 from the direction parallel with the symmetrical axis 140 of the parabola of the cross section of the transmissive cover 145-1, and the reflected light 62 is focused on at the focal point (FIG. 11B).

If the reflected light 62 of the sunlight 60 is focused on the focal point, energy concentrates on one point, which might cause an unexpected trouble.

Hereinafter, the transmissive cover 45 according to Example n (1≤n≤9) of an embodiment of the present disclosure is referred to as a transmissive cover 45-*n*. That is, the transmissive cover 45 according to the present embodiment has characteristics of at least one transmissive cover 45-*n* of transmissive covers 45-1 to 45-9 according to Examples 1 to 9. Conversely, the description of the transmissive cover 45 is common among the transmissive cover 45-*n* of each Example.

In this specification, a transmissive cover 145-*m* according to Comparative Example m (1≤m≤6) is appropriately described as a comparative target of the transmissive cover 45-*n* according to Example n. The transmissive cover 45 according to the embodiments of the present disclosure may adopt the characteristics of at least one transmissive cover 145-*m* of the transmissive covers 145-1 to 145-6 according to Comparative Examples 1 to 6.

First, the inventor developed the transmissive cover 45-1 according to Example 1 of an embodiment of the present disclosure. The transmissive cover 45-1 has a predetermined curve having a different parabola of the cross section.

Figure 11C:
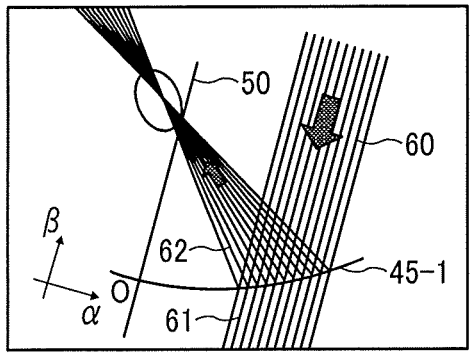
FIGS. 11C and 11D are illustration for explaining the characteristics of sunlight reflected by a transmissive cover according to Example 1 of the present disclosure.
Figure 11D:
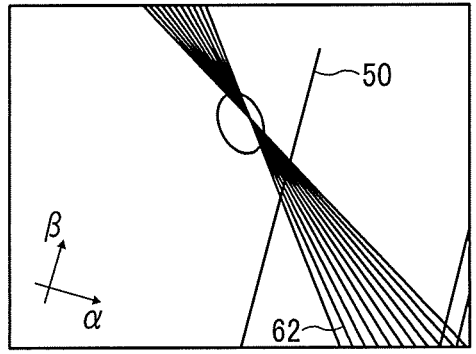

In this case, even if the sunlight travels to hit the transmissive cover 45-1 from the direction parallel to the reference axis 50, the reflected light is not focused on the focal point (see FIGS. 11C and 11D). Accordingly, the configuration according to Example 1 can prevent the troubles that might occur in the transmissive cover 145-1 according to Comparative Example 1.

Figure 12:
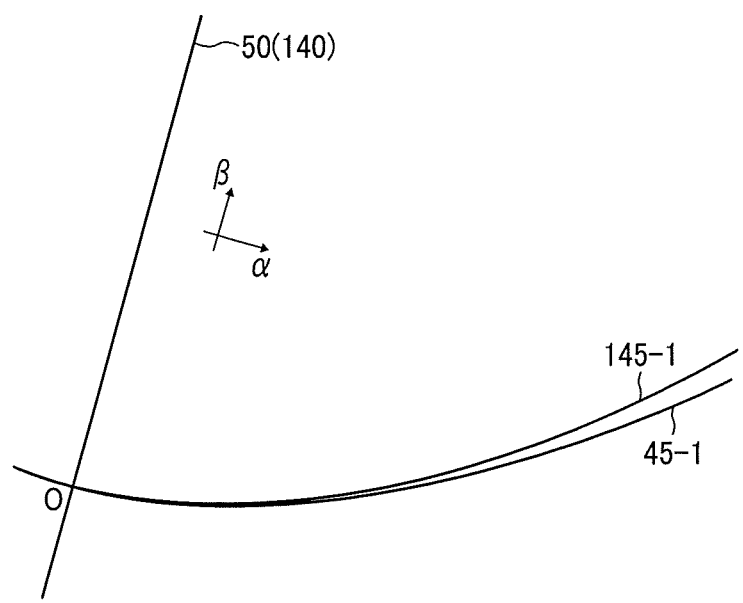
FIG. 12 is an illustrating of the difference in the shape of the transmissive cover between Comparative Example 1 and Example 1.

Specific examples of the predetermined curve include a curved line (for example, a part of an ellipse or a hyperbola, see FIG. 12) and a circular arc having a smaller or larger curvature with an increase in distance from the reference axis 50 than the curvature of the parabola of the cross section of the transmissive cover 145-1 according to Comparative Example 1 when the reference axis 50 matches the symmetrical axis 140 of the transmissive cover 145-1. When the predetermined curve is, for example, a part of an ellipse, the reference axis 50 may be the axis of symmetry (major axis or minor axis) of the ellipse. When the predetermined curve is, for example, a part of a hyperbola, the reference axis 50 may be the symmetrical axis of the hyperbola (the axis that lies between the two curves or the axis that passes through the two focal points).

The configuration, in which the cross section of the transmissive cover 45-1 has a curved shape having a smaller curvature than the parabola of the transmissive cover 145-1, can prevent an increase in the size of the cross section of the reference axis 50 more successfully than the configuration in which the cross section of the transmissive cover 45-1 has a curved shape having a larger curvature. With the configuration, in which the cross section of the transmissive cover 45-1 has a curved shape having a smaller curvature than the parabola of the transmissive cover 145-1, the size of the transmissive cover 45-1 in the height direction (Y-axis direction) can be successfully reduced. Thus, the above-described third capability can be achieved.

The sunlight 60 hitting the transmissive cover 45-1 is divided into the transmitted light 61 and the reflected light 62 (see FIG. 11C). Note that the parabola of the cross section of the transmissive cover 45-1 has a curved shape or a circular arc shape in which the curvature varies. Accordingly, when sunlight as parallel light rays travels to hit the transmissive cover 45-1 from the direction parallel with the reference axis 50, the light reflected by the transmissive cover 45-1 is not focused on one point (for example, the focal point), and the light has a certain size of a minimum light-beam bundle diameter.

The cross-sectional shape of the transmissive cover 45-1 (the above-mentioned predetermined curve in this case) is expressed by formula (1) below using the $\alpha\beta$ two-dimensional orthogonal coordinate system in which $\beta$ axis matches the reference axis 50 within a virtual plane (hereinafter also referred to as "$\alpha\beta$ plane" or "reference plane") which is not parallel to the X-axis. However, the cross-sectional shape of the transmissive cover 45-1 is not limited to the following formula (1), but another formula may be used. $\beta = c\alpha^2 / [1 + (1-(1+k)c^2\alpha^2)^{1/2}]$ (1) where ($\alpha$, $\beta$) denotes the two-dimensional coordinate with the origin O ($\alpha=0, \beta=0$) as a reference on the reference plane, a denotes a distance from a desired point on the predetermined curve having the reference axis 50 to the reference axis 50, $\beta$ denotes a distance from the desired point to the origin O in the direction of the reference axis 50, c denotes a paraxial curvature, and k denotes a conic coefficient.

In the present embodiment, c is 0.01 and k is −1.17 as an example, and sufficient effects are obtained.

Table 1 and Table 2 represent examples in which the reference plane and the origin O in the reference plane are expressed with the eye point EP of the AM 50 dummy as a reference.

TABLE 1

| ITEM | VALUE |
|---|---|
| X | 1.88 mm |
| Y | −198.21 mm |
| Z | −914.32 mm |
| s | 13.5° |
| t | 14.8° |
| u | −2.5° |

TABLE 2

| ITEM | VALUE |
|---|---|
| X | 1.31 mm |
| Y | −198.21 mm |
| Z | −918.55 mm |
| s | 13.5° |
| t | 15.8° |
| u | −2.7° |

In the above Tables 1 and 2, (X, Y, Z) is a three-dimensional coordinate of the origin point O of the reference plane in the XYZ three-dimensional orthogonal coordinate system when the three-dimensional coordinate of the eye point EP is designated as the origin point (0, 0, 0) in the XYZ three-dimensional orthogonal coordinate system.

In addition, in Table 1, s denotes the angle of rotation (CCW is positive) around the X-axis of the reference plane, t denotes the angle of rotation (CCW is positive) around the Y-axis of the reference plane, u denotes the angle of rotation (CW is positive) around the Z-axis of the reference plane.

In Table 1, the angle of rotation t around the Y-axis of the reference plane is 14.8°. In Table 2, the angle of rotation t around the Y-axis of the reference plane is 15.8°.

As can be understood from the above description, the transmissive cover 45-1 according to Example 1 can achieve the first, second and fourth capability.

In addition, the formula (1) obtains an extreme value on the reference axis 50 ($\alpha=0$).

Figure 13:
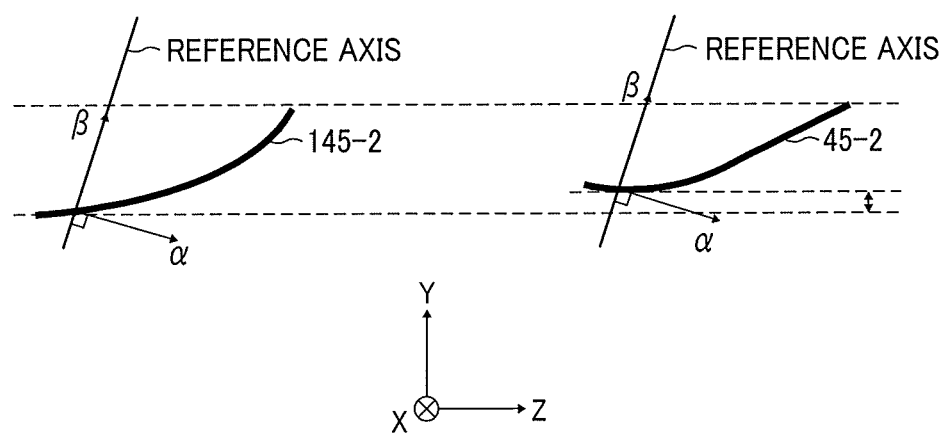
FIG. 13 is an illustration of the difference in the size of the transmissive cover in the height direction between Comparative Example 2 and Example 2.

As illustrated in FIG. 13, the transmissive cover 45-2 according to Example 2 has a curved-shaped cross section with a curved line having such an extreme value. That is, the transmissive cover 45-2 has a U-shaped cross section, which enables a reduction (thinning) in the size of the transmissive cover in the height direction (the Y-axis direction) more successfully than the transmissive cover 145-2 according to Comparative Example 2, whose cross section does not have an extreme value with the same width in the a direction, does.

Figure 14A:
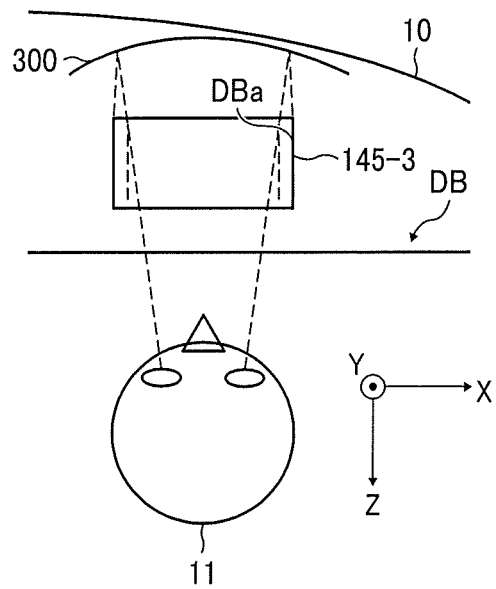
FIG. 14A is an illustration of a transmissive cover according to Comparative Example 3.
Figure 14B:
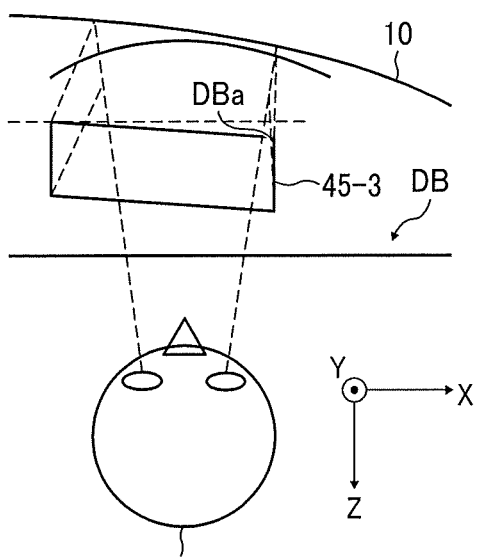
FIGS. 14B to 14D are illustrations of transmissive covers according to Examples 3 to 5, respectively.
Figure 14C:
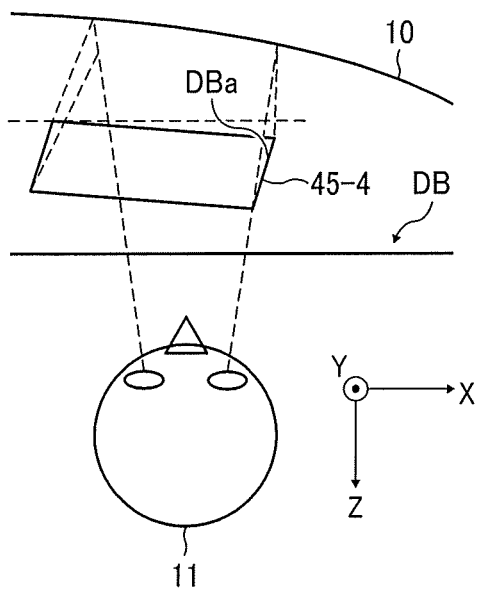
Figure 14D:
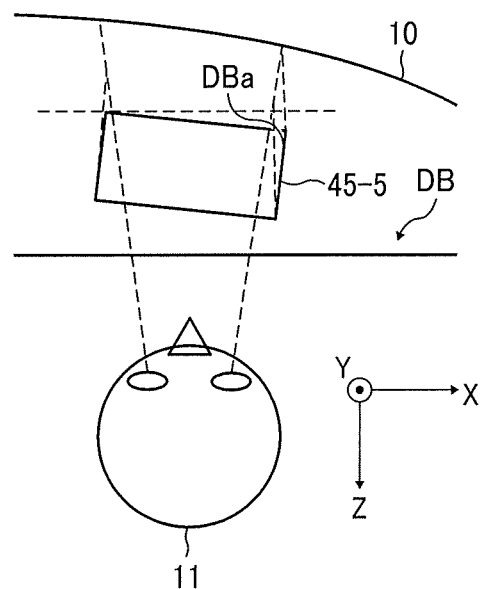

In Examples 3 to 5, the opening DBa and the transmissive cover 45 formed in the dashboard DB as viewed from the vertical direction (Y-axis direction) of the vehicle are made a horizontally long parallelogram, and at least long sides of the parallelogram is inclined with reference to the right-to-left direction (X-axis direction) of the vehicle (see FIGS. 14B to 14D). The advantageous effects of such a configuration are described below.

The projection method of a vehicle-mounted head-up display (HUD) such as the image display apparatus 1000 according to the embodiments of the present disclosure includes a windshield method (see FIGS. 14B to 14D) and a combiner method (see FIG. 14A). In the windshield method, picture light (image light) generated by the main body (the image light generation unit 500) is projected toward the windshield, and the picture light is reflected by the windshield so as to allow the reflected picture light to be observed by the driver. In the combiner method, the image light generated by the main body is projected to a combiner provided between the windshield and the driver, and the picture light reflected by the windshield is observed by the driver.

In the windshield system, the shape of the windshield is based on the vehicle body design and is designed to be symmetrical with respect to the center in the lateral direction (right-to-left direction) of the vehicle body. Accordingly, as described above, the windshield has an inclined portion on the right or left side in the lateral direction. That is, the windshield is asymmetrical in front of the driver in the lateral direction. Whether the inclined portion is on the right side or left side depends on the position of the driver's seat (on the right or left, i.e., a right-hand drive car or a left-hand drive car.

On the other hand, in the combiner method, the combiner is designed independently of the vehicle body, so the design flexibility of the combiner shape is high, and it is also possible to design the combiner symmetrically with respect to the front of the driver. Accordingly, the combiner is advantageous in that there is no need to change the design depending on a right-hand drive car or a left-hand drive car. However, the combiner is placed between the windshield and the driver, and accordingly comes in sight of the driver, which might cause the driver to feel uncomfortable. For this reason, the combiner method is difficult to adopt for increasing an angle of view desired by the driver.

Thus, the windshield method is preferably adopted to increase an angle of view desired by the driver.

In the windshield method, as described above, the windshield for reflecting the image light is inclined with reference to the lateral direction of the vehicle body. With such an inclination, the image light that appears horizontal (normal) at the position of the transmissive cover for the driver, appears inclined with reference to the lateral direction when reflected by the windshield.

In view of such a situation, by inclining the intermediate image of a horizontally elongated parallelogram (for example, a rectangle) as described above, the image light forming the intermediate image is inclined backward in a direction from the transmissive cover toward the outer side of the vehicle body. The image light reflected by the windshield seems horizontal (normal) from the driver in the lateral direction.

In Examples 3 to 5, in order to project such inclined image light toward the windshield 10, the shape of the opening DBa and the transmissive cover 45 formed in the dashboard DB when viewed from the Y-axis direction is configured to be a parallelogram whose inclination angle and inclination direction are the same as those of the inclined image light and whose longer side is inclined with reference to the X-axis (see FIGS. 14B to 14D).

FIG. 14A is an illustration of a transmissive cover 145-3 according to Comparative Example 3 used in the combiner method.

In Comparative Example 3, a combiner 300 is installed between the windshield 10 and the driver. Since the combiner 300 has a symmetrical shape in a state facing the driver, there is no need to incline the image light, and the opening DBa and the transmissive cover 145-3 formed in the dashboard DB have a rectangular shape as viewed from the Y-axis direction. The transmissive cover 145-3 is curved such that the YZ cross section draws, for example, the above-described predetermined curve.

FIGS. 14B to 14D are illustrations of transmissive covers 45-3 to 45-5 according to Examples 3 to 5 used for the windshield method, respectively.

The transmissive cover 45-3 and the opening DBa according to Example 3 has a parallelogram shape in which the longer side is inclined with reference to the X-axis and the shorter side is parallel with the Z-axis, viewed from the Y-axis direction (see FIG. 14B).

The transmissive cover 45-4 and the opening DBa according to Example 4 has a parallelogram shape (not rectangular) in which the longer side is inclined with reference to the X-axis and the shorter side is inclined with reference to the Z-axis, viewed from the Y-axis direction (see FIG. 14C).

The transmissive cover 45-5 and the opening DBa according to Example 5 has a rectangular shape in which the longer side is inclined with reference to the X-axis and the shorter side is inclined with reference to the Z-axis, viewed from the Y-axis direction (see FIG. 14D).

As described above, the present inventor has found the configuration that, in the image display apparatus 1000 according to the embodiments of the present disclosure, which is a HUD using the windshield method, the opening DBa and the transmissive cover 45 formed in the dashboard DB have a horizontally-long parallelogram shape in which at least the longer side is inclined with reference to the X-axis direction, viewed from the Y-axis direction.

In this configuration, the transmissive cover 45 has a shape (extended shape) in which the cross section curved in the predetermined curve within the $\alpha\beta$ plane is extended in the direction of inclination (hereinafter, referred to also as an extending direction ED) of the longer side of the parallelogram with reference to the X-axis direction.

At this time, the $\alpha\beta$ coordinate when any desired cross section parallel to the $\alpha\beta$ plane of the transmissive cover 45 is projected onto the $\alpha\beta$ plane becomes higher (position in the Y-axis direction) with an increase in distance from the origin point O ($\alpha=0, \beta=0$).

In the transmissive cover 145-4 according to Comparative Example 4 illustrated in FIGS. 15A to 15D, used in the windshield method, when the $\alpha\beta$ plane is set parallel to the YZ plane, the +Z side and +X side corner point is at a locally higher position (indicated by white arrow in FIGS. 15A to 15D) than in the transmissive cover 145-3 (FIG. 14A) of a rectangular shape viewed from the Y-axis direction, used in the combiner method according to Comparative Example 3. This is disadvantageous to achieving the third capability of the transmissive cover to reduce (thin) the size in the height direction.

Figure 15A:
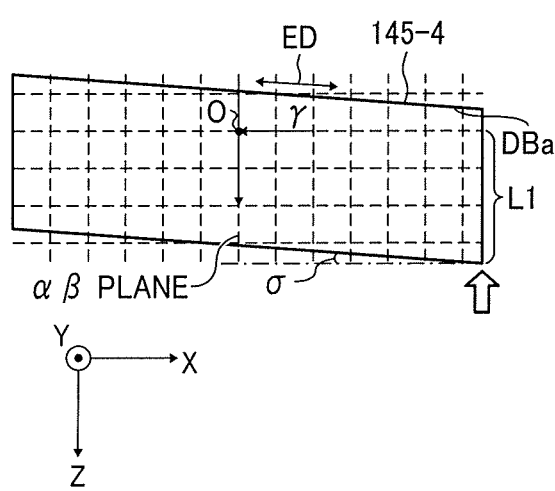
FIGS. 15A to 15D are illustrations of a transmissive cover according to Comparative Example 4.

The symbol "L1" in FIG. 15A denotes the distance between the origin point O and a point obtained by orthogonally projecting the +Z side and +X side corner point at the highest position (most extreme point on the +Y side of the transmissive cover of the transmissive cover 145-4) in the transmissive cover 145-4 onto the $\alpha\beta$ plane. The symbol "H1" in FIG. 15D denotes the maximum distance (length) of the transmissive cover 145-4 in the Y-axis direction.

Figure 15B:
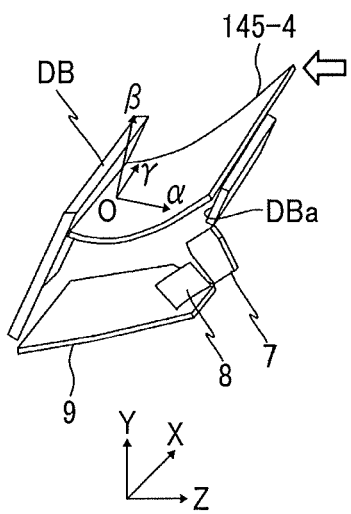
Figures 15C, 15D:
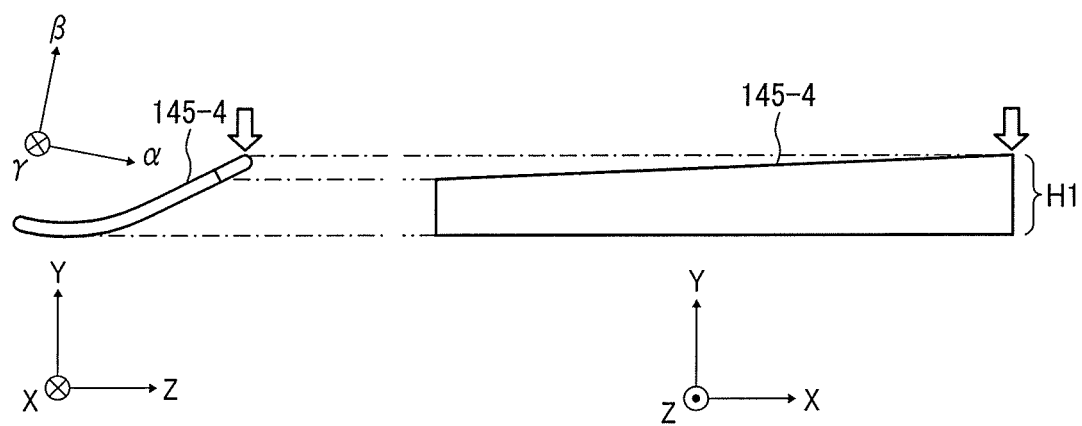

In FIGS. 15A to 15C, the $\alpha\beta\gamma$ three-dimensional orthogonal coordinate is determined in which an axis (normal to the $\alpha\beta$ plane) that passes through the origin point O and that is vertical with the $\alpha\beta$ plane is designated as $\gamma$ axis (parallel with the X-axis in this case).

In the transmissive cover 45-6 according to Example 6 illustrated in FIGS. 16A to 16D, used in the windshield method, the $\alpha\beta$ plane is inclined with reference to the YZ plane by an angle $\sigma$ (hereinafter, referred to as an inclination angle $\sigma$) around the Y-axis (the extending direction ED is made parallel to the long side of the opening DBa of the dashboard DB) such that the $\alpha\beta$ plane is substantially orthogonal to the longer side (inclined by an angle $\delta$ with reference to the axis) of the opening DBa of the dashboard DB. With such a configuration, the maximum distance from the origin O when any desired cross section orthogonal to the $\gamma$ axis of the transmissive cover 45-6 is projected onto the $\alpha\beta$ plane can be shortened. Thus, the reduction in the size of the transmissive cover in the height direction can be achieved (thinning of the transmissive cover can be achieved). With this configuration, the third capability is achieved. In this case, the third function can be achieved.

Figure 16A:
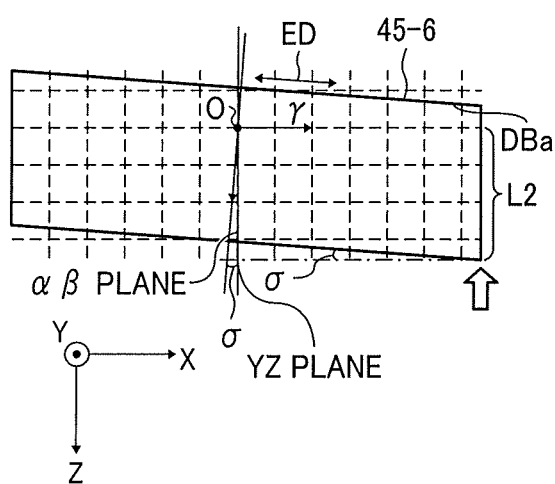
FIGS. 16A to 16D are illustrations of a transmissive cover according to Example 6.

The symbol "L2" in FIG. 16A denotes the distance between the origin point O and a point obtained by orthogonally projecting, onto the $\alpha\beta$ plane, the +Z side and +X side corner point at the highest position (most extreme point on the +Y side of the transmissive cover 45-6) in the transmissive cover 45-6. The symbol "H2" in FIG. 16D denotes the maximum distance (length) of the transmissive cover 45-6 in the Y-axis direction.

Note that the angle $\sigma$ (inclination angle $\sigma$) at which the longer side of the opening DBa is inclined with reference to the X-axis is substantially the same as the angle at which the intermediate image is inclined with reference to the X-axis, i.e., the angle at which the image light hitting the transmissive cover 45-6 is inclined with reference to the X-axis.

Figure 16B:
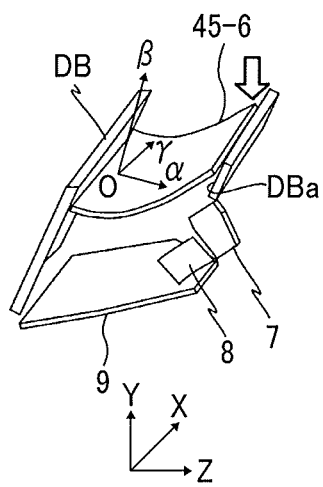
Figures 16C, 16D:
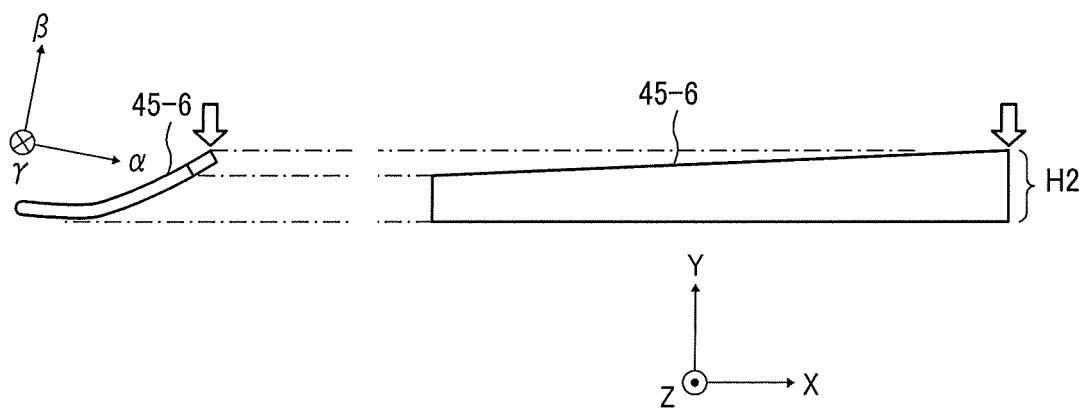

In FIGS. 16A to 16C, the $\alpha\beta\gamma$ three-dimensional orthogonal coordinate is determined in which an axis (normal to the $\alpha\beta$ plane) that passes through the origin point O and that is vertical with the $\alpha\beta$ plane is designated as $\gamma$ axis (inclined with reference to the X-axis in this case).

When the $\alpha\beta$ plane is inclined with reference to the YZ plane, the normal line of the $\alpha\beta$ plane inclination of the $\gamma$ axis, which is the normal to the $\alpha\beta$ plane, with respect to the YZ plane.

In this case, since L1 is greater than L2 (L1>L2), H1 is greater than H2 (H1>H2). That is, the transmissive cover 45-6 according to Example 6 enables the downsizing (thinning) of the transmissive cover 145-4 according to Comparative Example 4.

In Example 6, the inclination angle $\sigma$ of the $\alpha\beta$ plane with reference to the YZ plane is preferably in a range of from 12° to 20°. If this inclination angle $\sigma$ deviates from this range (12° to 20°), the height of any one of the corners of the transmissive cover 45-6 locally increases, which fails to reduce the thickness.

The transmissive cover 45-6 may be made of, for example, a transparent or translucent resin or glass plate that is, for example, molded using a mold. In this case, such a plate has the above-described predetermined curve in which any desired cross section orthogonal to the $\gamma$ axis is inclined by the angle $\sigma$ with respect to the YZ plane. However, such a configuration might increase the cost.

In order to prevent an increase in cost, a flexible transparent or translucent sheet, such as a resin film, may be used as the transmissive cover 45-6. Such a flexible sheet is held by a bent frame member of the predetermined curve in which any desired cross section orthogonal to the $\gamma$ axis is inclined by the angle $\sigma$ with respect to the YZ plane.

As can be understood from the above description, the transmissive cover 45-6 according to Example 6 can achieve the first, second, third and fourth capability.

The image display apparatus 1000 according to the embodiments of the present disclosure is configured to emit image light transmitted through the transmissive cover 45 to the windshield 10, so as to display an enlarged virtual image 12 superimposed on the sight ahead of the driver. Accordingly, the image display apparatus 1000 itself is disposed not to block the sight ahead of the driver.

The viewing angle θ of the driver from the X-axis direction increases as the angle δ formed between the line of sight of the driver viewing the front end (the −Z-side end) of the transmissive cover 45 and the line of sight of the driver viewing the back end (the +Z-side end) of the transmissive cover 45 decreases, assuming that the height of the center of gravity of the transmissive cover 45 is constant.

Figure 17A:
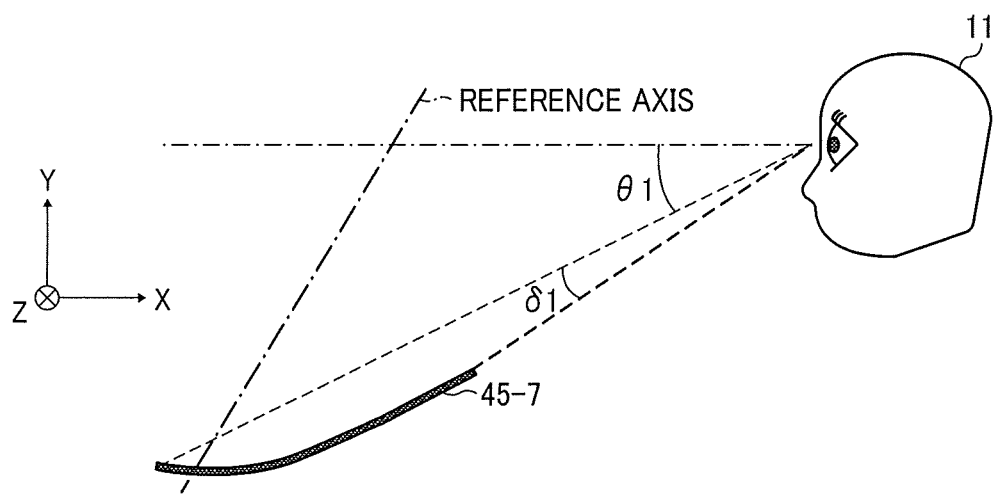
FIGS. 17A and 17B are illustrations of transmissive covers according to Example 7 and Comparative Example 5, respectively.

More specifically, the transmissive cover 45-7 according to Example 7 is disposed at an angle δ=δ1 as illustrated in FIG. 17A. The transmissive cover 145-5 according to Comparative Example 5 (substantially the same transmissive cover as the transmissive cover 45-7) is disposed at an angle δ=δ2 (of greater than δ1), having the same height of center of gravity as the height of center of gravity of the transmissive cover 45-7, illustrated in FIG. 17B. The transmissive cover 45-7 provides a greater viewing angle than the transmissive cover 145-5 does.

Figure 17B:
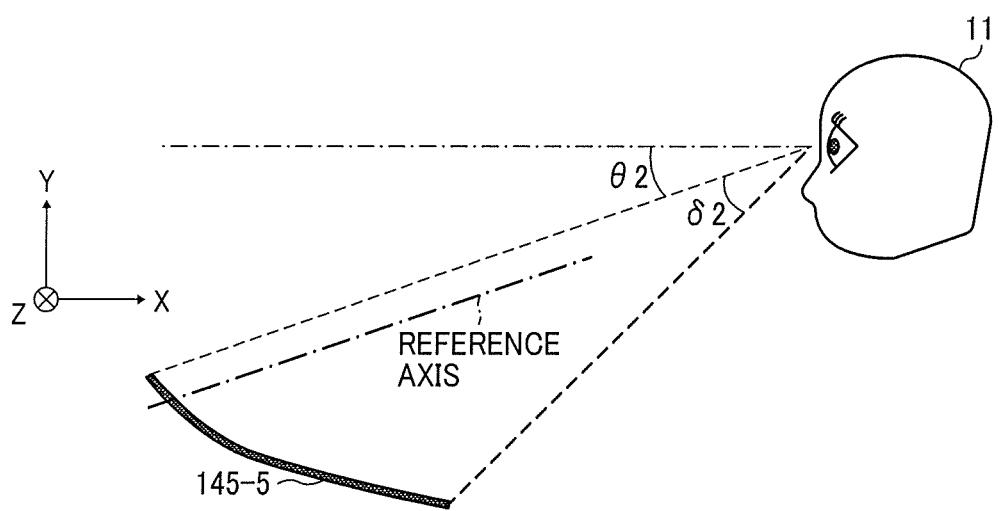

That is, it can be found that the viewing angle θ in FIG. 17A according to Example 7 is greater than the viewing angle θ2 in FIG. 17B according to Comparative Example 5.

Thus, even with a constant height of center of gravity for the transmissive cover, the angle δ changes with the angle at which the transmissive cover 45 is disposed, and accordingly the viewing angle θ also changes.

Preferably, the angle δ is particularly 1.5° or less from the viewpoint of securing a sufficient viewing angle θ.

Figure 18A:
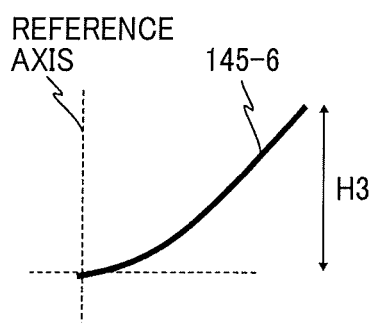
FIGS. 18A and 18B are illustrations of transmissive covers according to Comparative Example 6 and Example 8.
Figure 18B:
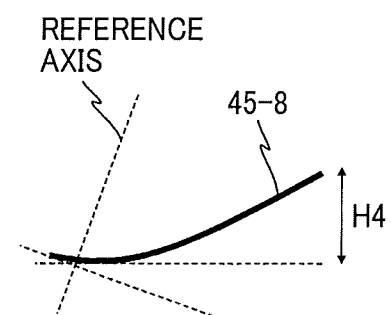

FIG. 18A is an illustration of the transmissive cover 145-6 according to Comparative Example 6 whose major part is disposed on the back side (on the +Z side) with reference to the reference axis as viewed from the X-axis direction, with the reference axis parallel with the Y-axis. FIG. 18B is an illustration of the transmissive cover 45-8 according to Example 8 whose major part (over half part) is disposed on the back side (the +Z side) with reference to the reference axis as viewed from the X-axis direction. In FIG. 18B, the reference axis is inclined with reference to the Y-axis to be inclined toward the +Z side in a direction to the +Y side as viewed from the X-axis direction. The transmissive cover 145-6 and the transmissive cover 45-8 are substantially identical to each other except for the angles at which the transmissive cover 145-6 and the transmissive cover 45-8 are disposed.

In this case, H3 is greater than H4 (H3>H4) where H3 denotes the dimension in the height direction of the transmissive cover 145-6 according to Comparative Example 6 and H4 denotes the dimension in the height direction of the transmissive cover 45-8 according to Example 8.

In other words, the configuration according to Example 8, in which the reference axis is inclined with reference to the Y-axis, can achieve the reduction in thickness of the transmissive cover 45 more successfully than the configuration according to Comparative Example 6, in which the reference axis is parallel with the Y-axis, does.

However, the viewing angle θ decreases depending on the degree of inclination of the reference axis with reference to the Y-axis. For this reason, it is preferable to incline the reference axis with reference to the Y-axis by an angle less than or equal to the angle at which the minimum viewing angle θ can be obtained.

Regarding the second capability, even if the reflection direction of the primary reflected light (the light reflected by the transmissive cover 45) of disturbance light (for example, sunlight) is controlled by the transmissive cover 45, the secondary reflected light (light reflected by the windshield 10) might travel to the eye point of the driver.

Figure 19:
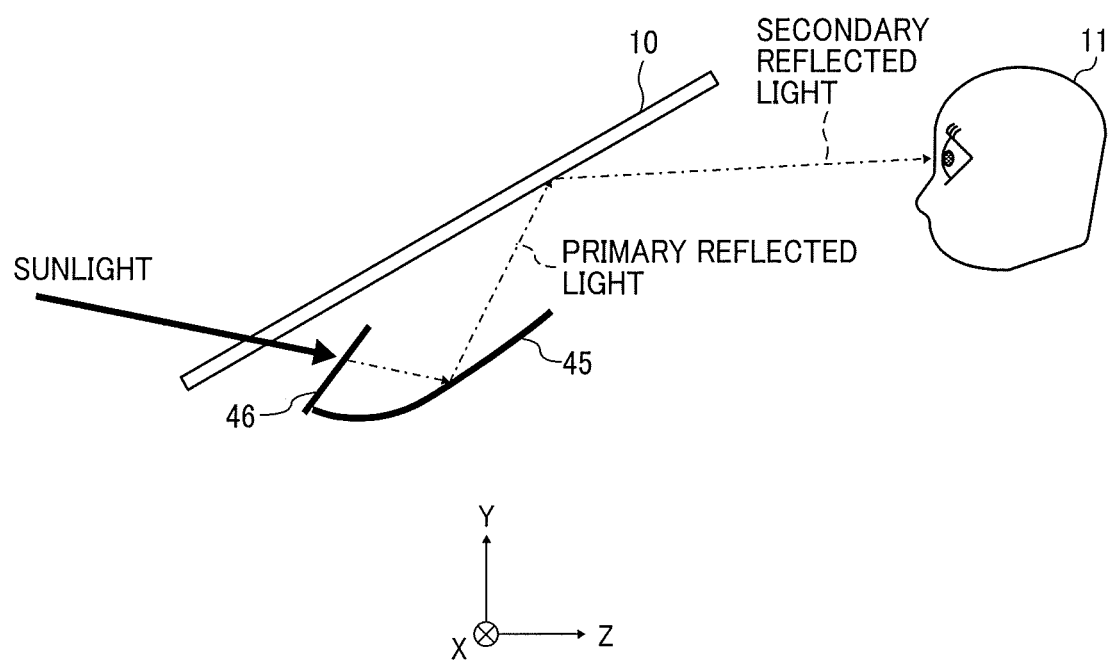
FIG. 19 is an illustration of an arrangement of a light shield according to an embodiment of the present disclosure.
Figure 20A:
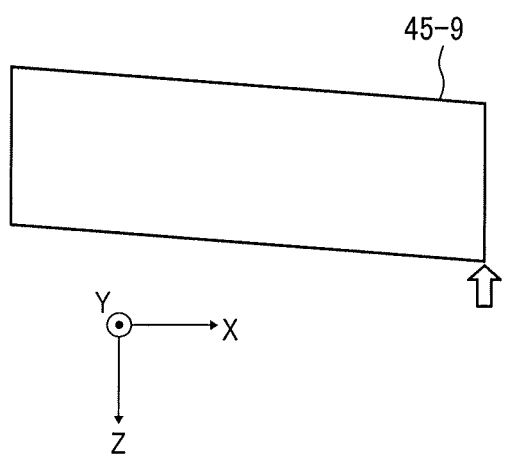
FIGS. 20A to 20D are illustrations of a transmissive cover according to Example 9 of the present disclosure.
Figure 20B:
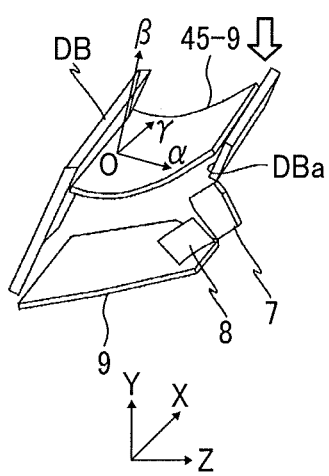
Figure 20C:
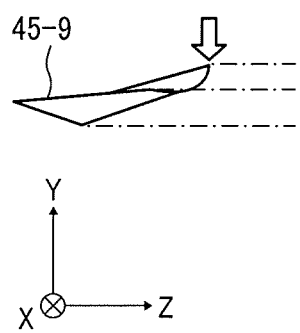
Figure 20D:
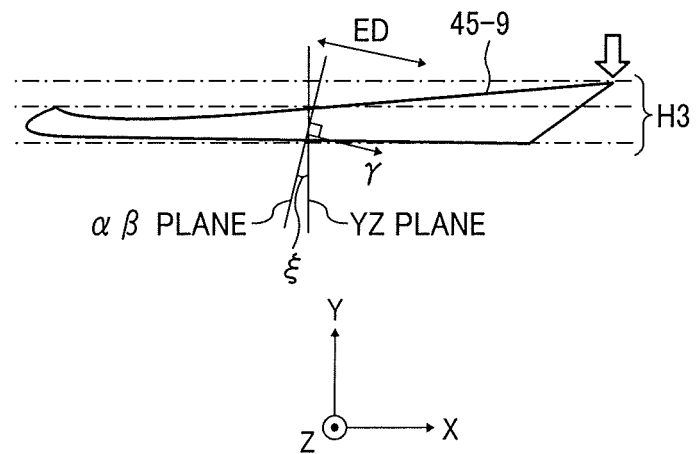

To avoid such a situation, as illustrated in FIG. 19, a light shield 46 is disposed between the windshield 10 and the transmissive cover 45 to a part of external light such as sunlight.

In this case, the light shield 46 is preferably disposed at a as low position as possible to maximize the viewing angle θ. Further, it is sufficient that the light shield 46 blocks external light whose secondary reflected light that might reach the eye point of the driver (see the broken line arrow in FIG. 19).

Thus, the light shield 46 is preferably disposed at a as low position as possible and is capable of blocking only external light that might reach the eye point of the driver.

The light shield 46 may be a member capable of reflecting incident light. More preferably, the light shield 46 may be a member capable of absorbing incident light in view of the possibility that some of the incident light reflected by the light shield might be further reflected by the windshield 10 and the reflected light is directed to the eye point of the driver.

Alternatively, the light shield 46 may serve as a part of the dashboard DB. In this case, a cockpit designed may be adopted in which the dashboard DB is combined with the light shield 46.

The image display apparatus 1000 (a HUD) according to the embodiments described above is mounted on a vehicle (a mobile object) and is configured to emit image light to the windshield 10 (transmission and reflection member) of the vehicle to display an image on the windshield. The image display apparatus 1000 includes an image light generation unit 500 to emit the image light to the windshield 10 and the transmissive cover 45 (transmission member) disposed in the optical path between the image light generation unit 500 and the windshield 10, configured to transmit the image light from the image light generation unit 500. The transmissive cover 45 has a cross section of a predetermined curve (drawing a prescribed curved line), orthogonal to the γ direction (a prescribed direction). In this case, the γ direction is inclined with reference to the YZ plane that is a virtual plane orthogonal to the X-axis direction (the right-to-left direction of the vehicle).

Such a image display apparatus 1000 achieves a reduction in the size of the transmissive cover 45 in the up-to-down direction of the vehicle while preventing the external light reflected by the transmissive cover 45 from being directed to the eye point of the observer 11 of the image.

Further, the shape of the transmissive cover 45 viewed from the Y-axis direction (the up-to-down direction (vertical direction) of the vehicle) is preferably a parallelogram in which at least one set of two sides opposed to each other (particularly, at least two sides facing the front-to-back direction of the vehicle) is inclined with reference to the X-axis direction (the right-to-left direction of the vehicle).

In the embodiments of the present disclosure, the transmissive cover 45 has a horizontally elongated parallelogram shape viewed from the Y-axis direction. In some embodiments, the transmissive cover 45 may have a vertically elongated parallelogram.

Further, the shape of the transmissive cover 45 viewed from the Y-axis direction is not limited to a parallelogram and may be any shape according to the shape of image light generated by the image light generation unit.

The inclination angle of the cross section with reference to the YZ plane is preferably 12° to 20°.

Further, the cross section may be inclined with reference to the YZ plane around the Y-axis direction (vertical direction of the vehicle).

Further, the cross section may be inclined with reference to the YZ plane around the Z-axis direction (front-to-back direction of the vehicle).

The predetermined curve is a curved line or a circular arc having a reference axis other than a parabola. When the reference axis of the curved line matches the symmetrical axis of the parabola, the curved line has a smaller curvature as the distance from the reference axis increases, than the parabola does.

Preferably, the predetermined curve has the major part on the back side (the +Z side) with reference to the reference axis in the Z-axis direction (the front-to-back direction of the vehicle). Further, the reference axis is preferably inclined with reference to the Y-axis direction (the up-to-down direction of the vehicle) to be inclined toward the +Z side (backward) in a direction to the +Y side (the upper side).

Also, when viewed from the X-axis direction (the left-right direction of the vehicle), the line of sight when the observer 11 of the image views the end on the −Z side (front end) of the transmissive cover 45 in the Z-axis direction and the line of sight when looking at the +Z side end (rear end) of the transmissive cover 45 in the Z-axis direction is 1.5° or less.

Further, it is preferable that the cross section is curved so as to be convex toward the image light generation unit 500 side. This configuration can prevent the primary reflected light and the secondary reflected light from traveling to the eye point of the observer 11 more successfully than the configuration in which the transmissive cover 45 has a cross section that is convex toward the windshield side.

In the embodiments of the present disclosure, the transmissive cover 45 may have a cross section that is convex toward the windshield side.

Preferably, the image display apparatus 1000 further includes a light shield 46 disposed between the windshield 10 and the transmissive cover 45. This configuration can prevent the secondary reflected light from being directed to the eye point of the observer 11.

Further, according to the vehicle apparatus (mobile apparatus) including the image display apparatus 1000 of the present embodiments and the vehicle on which the image display apparatus 1000 is mounted, since the transmissive cover 45 is thinned, the amount of projection of transmissive cover 45 on the opening DBa of the dashboard DB of the vehicle, can be reduced. As a result, the influence on the design property of the dashboard DB can be reduced.

Note that the reference plane (αβ plane) may be inclined with reference to the YZ plane around the Z-axis (the front-to-back direction of the vehicle) as the transmissive cover 45-9 according to Example 9 illustrated in FIGS. 20A to 20D. Such a configuration can exhibit the same advantageous effects as the effects of the transmissive cover 45-6 according to Example 6.

Further, the transmissive cover 45-9 preferably has an inclination angle ζ (see FIG. 20D) of 12° to 20° with reference to the YZ plane around the Z-axis of the αβ plane.

Further, the αβ plane may be inclined with reference to the YZ plane, around the Y-axis or around the Z-axis.

In short, it is sufficient to incline the αβ plane with reference to the YZ plane around at least one axis crossing the X-axis. Even when the αβ plane is inclined with reference to the YZ plane around any one of the at least one axis, the inclination angle thereof is preferably 12° to 20°.

In the above-described embodiments, the image display apparatus 1000 makes an intermediate image inclined and performs shearing deformation on the intermediate image. However, no limitation is intended thereby. In such a case, the deformation of a virtual image can be sufficiently reduced. Further, in such a case, the inclination angle of the intermediate image is preferably adjusted according to the shape of the windshield.

In the embodiments described above, the projection optical system is composed of a single mirror (i.e., the concave mirror 9), but no limitation is intended therein. For example, an optical element such as a mirror or lens may be provided before or after the concave mirror 9. It is desired that the projection optical system be compact and be capable of magnifying and projecting the intermediate image that is formed on the to-be-scanned surface 8.

In the embodiments described above, the to-be-scanned surface 8 (intermediate image) is arranged to inclined with reference to the XZ plane, but may be arranged parallel to the XZ plane. In such cases, it is desired that the intermediate image be formed on the to-be-scanned surface 8 inclined with reference to the X-axis direction (i.e., the right-to-left direction of the mobile object) when viewed from the Y-axis direction (i.e., the up-to-down direction of the mobile object). In other words, it is desired in the image display apparatus 1000 that the intermediate image be inclined with reference to the right-to-left direction of the mobile object when viewed from at least one of the front-to-back direction and the up-to-down direction of the mobile object.

In the embodiment described above, cases in which a HUD is provided for a vehicle with right-side steering wheel were described. However, no limitation is indicated therein, and the HUD according to an example embodiment of the present disclosure may be applied to a vehicle with left-side steering wheel in a similar manner. More specifically, since a left portion of the incidence area is bent backward to a greater degree in a vehicle with left-side steering wheel as known in the art, it is desired that the intermediate image be inclined such that a left portion of the image with reference to the right-to-left direction of the mobile object is displayed downward. When the to-be-scanned surface 8 is arranged parallel to the XZ-plane, it is desired that the intermediate image be inclined such that a left portion of the image with reference to the right-to-left direction of the mobile object is displayed backward. Moreover, in a vehicle with left-side steering wheel, it is desired that shearing deformation be performed in the direction opposite to the images illustrated in FIGS. 7 to 9 in which a right portion of the original image is deformed upward to a greater degree. In other words, it is desired in a vehicle with left-side steering wheel that shearing deformation be performed such that a left portion of the original image is deformed upward to a greater degree.

In the example embodiment described above, shearing deformation is performed on an original image such that the rows of the image are parallel with each other in the main-scanning direction. However, no limitation is intended thereby, and shearing deformation may be performed on an original image such that the columns of the image become parallel to each other in the sub-scanning direction. For example, shearing deformation may be performed such that a right portion of the original image is deformed upward to a greater degree in a vehicle with right-side steering wheel, and shearing deformation may be performed such that a left portion of the original image is deformed upward to a greater degree in a vehicle with left-side steering wheel.

In the above-described embodiments, a scanning unit that includes a two-dimensional deflector is used as an image light generator. However, any other system such as a system with transmissive liquid crystal including a transmissive liquid crystal panel, a system with reflective liquid crystal including a reflective liquid crystal panel, and a digital light processing (DLP) system including a digital micromirror device (DMD) may be used as long as that system can form an intermediate image.

In the above-described embodiments, a microlens array is used as the to-be-scanned surface. However, no limitation is intended thereby, and for example, a micromirror array, a diffusing board, a transmissive screen, and a reflective screen may be used for a to-be-scanned surface.

In the microlens array according to the example embodiment described above, a plurality of microlenses are two-dimensionally arranged, but may be one-dimensionally or three-dimensionally arranged.

In the example embodiment described above, a two-dimensional deflector performs two-dimensional scanning on a microlens array to form a two-dimensional image. However, no limitation is indicated thereby, and a one-dimensional deflector such as a MEMS mirror, a galvano mirror, a polygon mirror may be used to perform one-dimensional scanning to form a one-dimensional image.

In the example embodiment described above, a color image is generated. However, no limitation is indicated therein, and a monochrome image may be generated instead of the color image.

In some embodiments, the transmission and reflection member may be a combiner disposed between the windshield of the mobile body and the observer. In this case, the combiner is irradiated with the image light transmitted through the transmissive cover, and the light reflected by the combiner is directed to the eye point of the observer. Thus, the observer can visually recognize the virtual image.

In such cases, it is desired that the following processes be performed according the shape or position of the transmission and reflection member: the processes of making the intermediate image oblique in the right-to-left direction of the mobile object, making the intermediate image oblique in the up-to-down direction of the mobile object, and performing shearing deformation on the intermediate image.

For example, when the transmissive cover has a rectangular shape in which the longer side is parallel to the X-axis direction viewed from the Y-axis direction, the thickness of the transmissive cover can be reduced by inclining the αβ plane with respect to the YZ plane.

Moreover, the transmission and reflection member is not limited to the windshield of the mobile object, but may be a different window such as a side glass and a rear glass that is used for the visual recognition of the outside of the mobile object. In the example embodiment described above, the transmission and reflection member is made of glass. However, no limitation is indicated thereby, and the transmission and reflection member may be made of, for example, resin.

A target (observer) for which a virtual image is made visually recognizable by the image display apparatus according to the present example embodiment is not limited to the driver of the mobile object, but may be, for example, a navigator or passenger who are in the mobile object.

In the embodiment described above, cases in which the image display apparatus is provided for a mobile object such as a vehicle, an aircraft, and a ship were described. However, no limitation is indicated thereby, and modification may be made as long as the image display apparatus is provided for an object. It should be noted that the "object" includes not only a mobile object but also an object that is located on a permanent basis or an object that is transportable. However, it is particularly preferable that the object is a mobile object on which an observer of the image boards.

Although the embodiments of the present disclosure have been described above, the present disclosure is not limited to the embodiments described above, but a variety of modifications can naturally be made within the scope of the present disclosure. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image display apparatus mountable on a mobile object, the image display apparatus comprising:
an image light generator configured to generate image light and to emit the image light to a transmission and reflection surface mounted on the mobile object; and
a transmissive cover disposed in an optical path of the image light between the image light generator and the transmission and reflection surface, the transmissive cover being configured to transmit the image light emitted from the image light generator, wherein
the transmissive cover has upper and lower surfaces each in a shape of a parallelogram such that, when viewed along a vertical axis of the moving object that is orthogonal to a moving direction of the moving object, a long side of each parallelogram is positioned such that a first angle greater than zero is between the long side of each parallelogram and a horizontal axis of the mobile object, the horizontal axis being orthogonal to the vertical axis and the moving direction of the moving object,
the transmissive cover has a cross section with a predetermined curve, the cross section being orthogonal to a predetermined direction inclined in a plane orthogonal to the horizontal axis,
the image light generator includes a to-be-scanned surface to form thereon an intermediate image with the image light to be tilted relative to the to-be-scanned surface to allow the image light forming the intermediate image, emitted from the image light generator, to hit the lower surface of the transmissive cover at the first angle with respect to the horizontal axis while allowing the intermediate image to be tilted backward in a direction from the transmissive cover toward the outer side of the mobile object,
the predetermined curve is either a curved line or a circular arc, having a reference axis other than a parabola, and
in a case that the reference axis of the curved line matches a symmetrical axis of the parabola, the curved line has a smaller curvature than a curvature of the parabola with an increase in a distance from the reference axis.

2. The image display apparatus according to claim 1, wherein at least one of the upper and lower surfaces of the transmissive cover is inclined along the vertical axis of the moving object.

3. The image display apparatus according to claim 1, wherein an angle at which the cross section is inclined with reference to the plane is in a range of from 12° to 20°.

4. The image display apparatus according to claim 1, wherein the cross section is inclined with reference to the plane around the vertical axis of the mobile object.

5. The image display apparatus according to claim 1, wherein the cross section is inclined with reference to the plane around a front-to-back axis along the moving direction of the mobile object.

6. The image display apparatus according to claim 1, wherein
an over-half part of the curved line having the reference axis is on a back side with reference to the reference axis along a front-to-back direction of the mobile object, and
the reference axis of the curved line is inclined with reference to the vertical axis of the mobile object to be inclined toward the back side in a direction to an upper side of the vertical axis of the mobile object.

7. The image display apparatus according to claim 1, wherein as viewed along the horizontal axis of the mobile object, a line of sight of a viewer viewing a front end of the transmissive cover in a front-to-back direction and a line of sight of the viewer viewing a back end of the transmissive cover in the front-to-back direction is 1.5° or less.

8. The image display apparatus according to claim 1, wherein the cross section is curved to be convex toward an image light generator side of the image display apparatus.

9. The image display apparatus according to claim 1, further comprising a light shield disposed between the transmissive cover and the transmission and reflection surface.

10. The image display apparatus according to claim 1, wherein the transmission and reflection surface is a windshield mounted on the mobile object.

11. A mobile apparatus, comprising:
the image display apparatus according to claim 1; and
the mobile object on which the image display apparatus is mounted.

12. An image display apparatus mountable on a mobile object, the image display apparatus comprising:
an image light generator configured to generate image light and to emit the image light to a transmission and reflection surface mounted on the mobile object; and
a transmissive cover disposed in an optical path of the image light between the image light generator and the transmission and reflection surface, the transmissive cover being configured to transmit the image light emitted from the image light generator, wherein
the transmissive cover has upper and lower surfaces each in a shape of a parallelogram such that, when viewed along a vertical axis of the moving object that is orthogonal to a moving direction of the moving object, a long side of each parallelogram is positioned such that a first angle greater than zero is between the long side of each parallelogram and a horizontal axis of the mobile object, the horizontal axis being orthogonal to the vertical axis and the moving direction of the moving object, and
the image light generator includes a to-be-scanned surface to form thereon an intermediate image with the image light to be tilted relative to the to-be-scanned surface to allow the image light forming the intermediate image, emitted from the image light generator, to hit the lower surface of the transmissive cover at the first angle with respect to the horizontal axis while allowing the intermediate image to be tilted backward in a direction from the transmissive cover toward the outer side of the mobile object.

13. The image display apparatus according to claim 12, wherein at least one of the upper and lower surfaces of the transmissive cover is inclined along the vertical axis of the moving object.

14. The image display apparatus according to claim 12, wherein as viewed along the horizontal axis of the mobile object, a line of sight of a viewer viewing a front end of the transmissive cover in a front-to-back direction and a line of sight of the viewer viewing a back end of the transmissive cover in the front-to-back direction is 1.5° or less.

15. The image display apparatus according to claim 12, further comprising a light shield disposed between the transmissive cover and the transmission and reflection surface.

16. The image display apparatus according to claim 12, wherein the transmission and reflection surface is a windshield mounted on the mobile object.

17. A mobile apparatus, comprising:
the image display apparatus according to claim 12; and
the mobile object on which the image display apparatus is mounted.

18. An image display apparatus mountable on a mobile object, the image display apparatus comprising:
an image light generator configured to generate image light and to emit the image light to a transmission and reflection surface mounted on the mobile object; and
a transmissive cover disposed in an optical path of the image light between the image light generator and the transmission and reflection surface, the transmissive cover being configured to transmit the image light emitted from the image light generator, wherein
the transmissive cover has upper and lower surfaces each in a shape of a parallelogram such that, when viewed along a vertical axis of the moving object that is orthogonal to a moving direction of the moving object, a long side of each parallelogram is positioned such that a first angle greater than zero is between the long side of each parallelogram and a horizontal axis of the mobile object, the horizontal axis being orthogonal to the vertical axis and the moving direction of the moving object,
the transmissive cover has a cross section with a predetermined curve, the cross section being orthogonal to a predetermined direction inclined in a plane orthogonal to the horizontal axis,
the image light generator includes a to-be-scanned surface tilted to form thereon an intermediate image with the image light to allow the image light forming the intermediate image emitted from the image light generator to hit the lower surface of the transmissive cover at the first angle with respect to the horizontal axis while allowing the intermediate image to be tilted backward in a direction from the transmissive cover toward the outer side of the mobile object,
the predetermined curve is either a curved line or a circular arc, having a reference axis other than a parabola, and
in a case that the reference axis of the curved line matches a symmetrical axis of the parabola, the curved line has a smaller curvature than a curvature of the parabola with an increase in a distance from the reference axis.

* * * * *